(12) United States Patent
Lang

(10) Patent No.: US 6,771,207 B1
(45) Date of Patent: Aug. 3, 2004

(54) ESTABLISHING RADAR COVERAGE, BLOCKAGE, AND CLUTTER REGION MAPS FOR RADAR PRODUCT DATA BASED ON TERRAIN ELEVATION DATA

(75) Inventor: Joseph C. Lang, Havortown, PA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 10/606,341

(22) Filed: Jun. 25, 2003

Related U.S. Application Data
(60) Provisional application No. 60/446,646, filed on Feb. 11, 2003.

(51) Int. Cl.[7] .............................................. G01S 13/00
(52) U.S. Cl. ......................... 342/26; 342/65; 342/120; 342/159; 342/176; 342/191
(58) Field of Search ........................ 342/26, 46, 64–65, 342/120, 123, 140, 159, 176, 179, 185, 191, 373; 702/3; 706/931

(56) References Cited

U.S. PATENT DOCUMENTS

| | | | | |
|---|---|---|---|---|
| 4,321,601 A | * | 3/1982 | Richman | 342/25 |
| 5,087,916 A | * | 2/1992 | Metzdorff et al. | 342/64 |
| 5,920,276 A | * | 7/1999 | Frederick | 342/26 |
| 6,184,816 B1 | * | 2/2001 | Zheng et al. | 342/26 |
| 6,233,522 B1 | * | 5/2001 | Morici | 701/208 |
| 6,401,038 B2 | * | 6/2002 | Gia | 701/301 |
| 6,512,976 B1 | * | 1/2003 | Sabatino et al. | 701/207 |

* cited by examiner

*Primary Examiner*—John B. Sotomayor
*Assistant Examiner*—Isam Alsomiri
(74) *Attorney, Agent, or Firm*—Michael B. Atlass; Mark T. Starr

(57) ABSTRACT

Radar coverage maps having blockage, coverage and clutter features available for ease of interpretation are provided using terrain data to establish such features in data sets. The data sets provide a basis for the modified display. Multiple tilts of the radar scan may be represented. Multiple radar zones may be overlapped to provide a mosaic of a region showing areas of no coverage despite overlap.

21 Claims, 24 Drawing Sheets

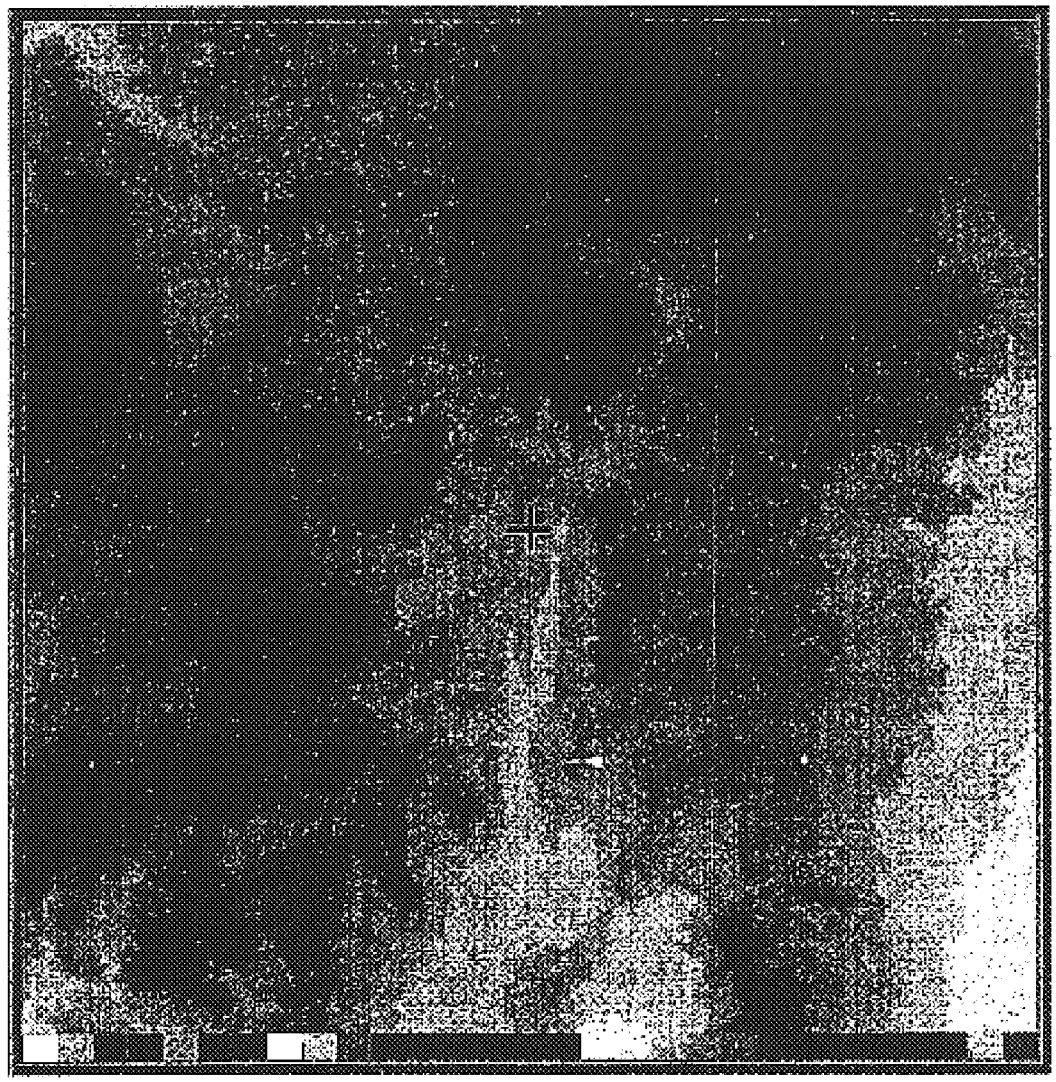
Figure 1 – Terrain Elevation Data for
Albuquerque WSR-88D Radar

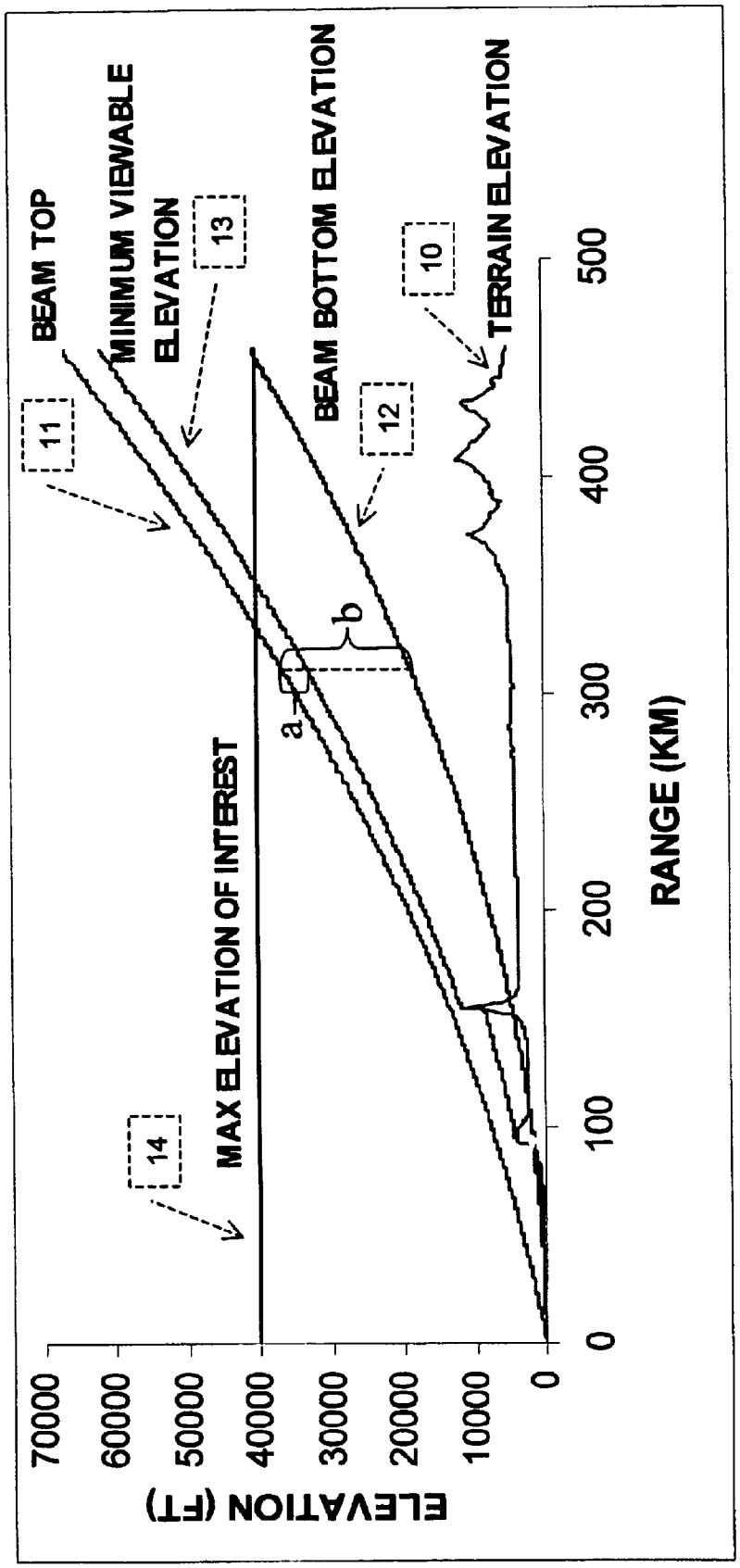
Figure 2 – Radar Coverage Map Model for Single Tilt Radar Products

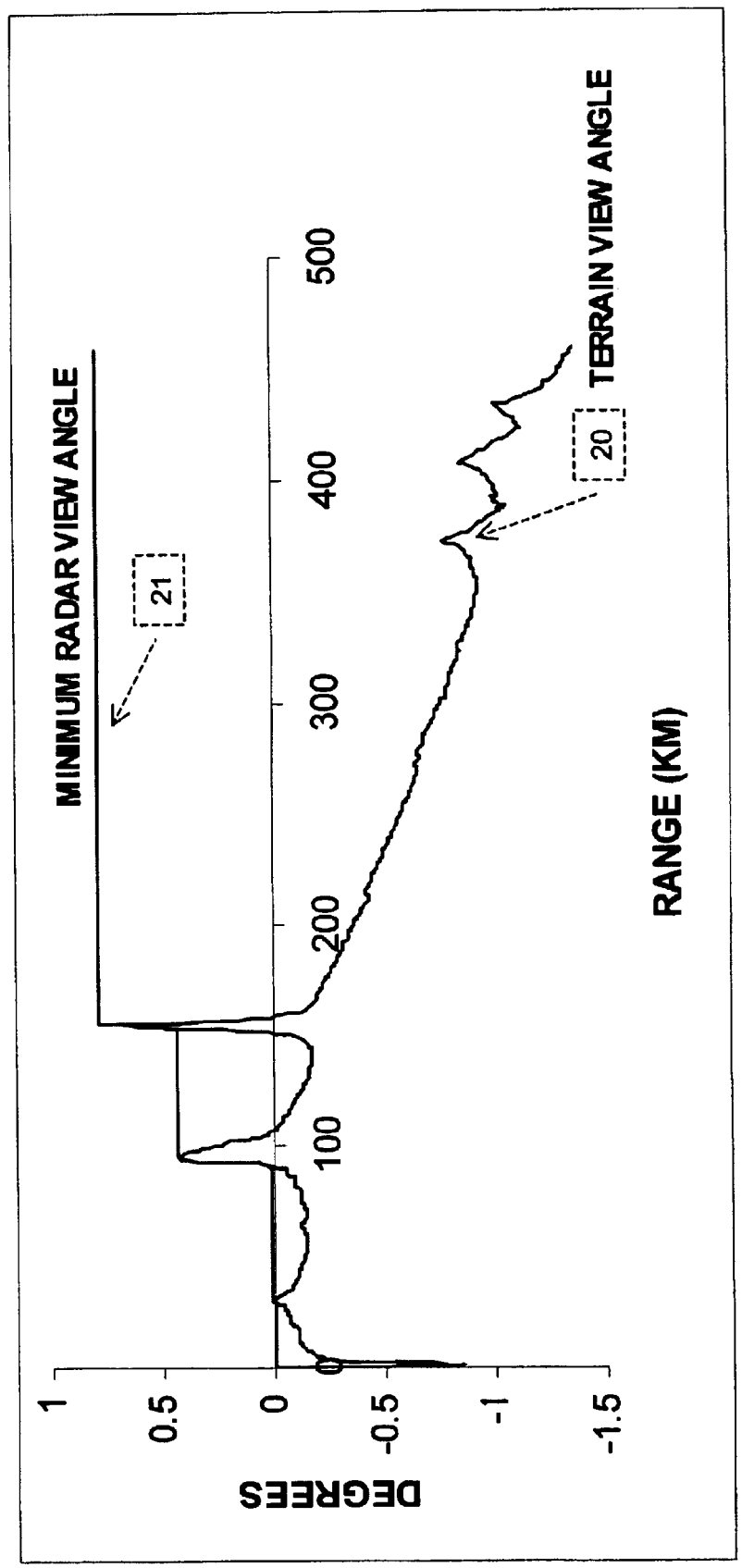
Figure 3 – Minimum Radar View Angle

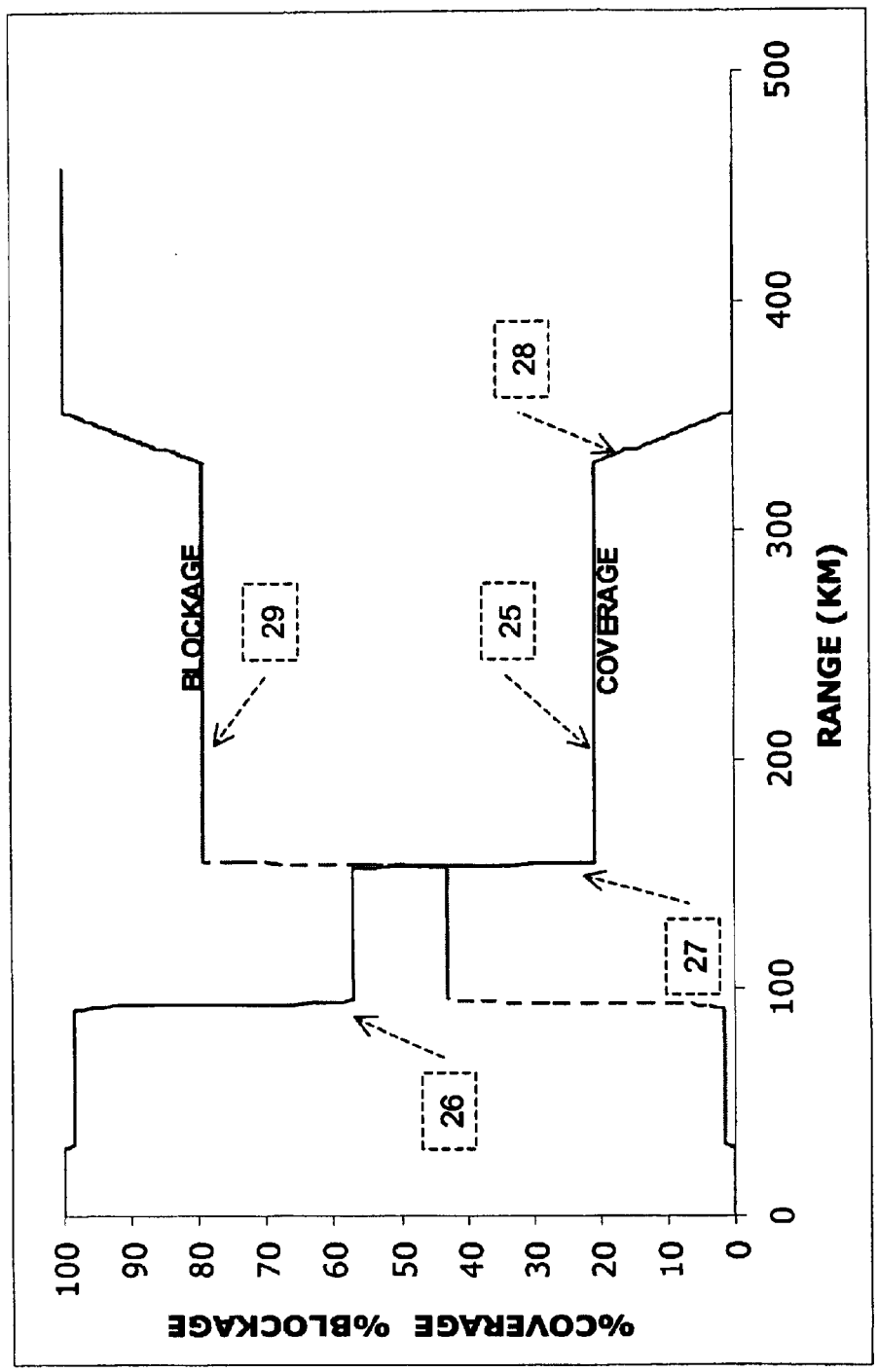
Figure 4 – Example of Radial Radar Coverage and Blockage Profiles for a Single Tilt Radar Product

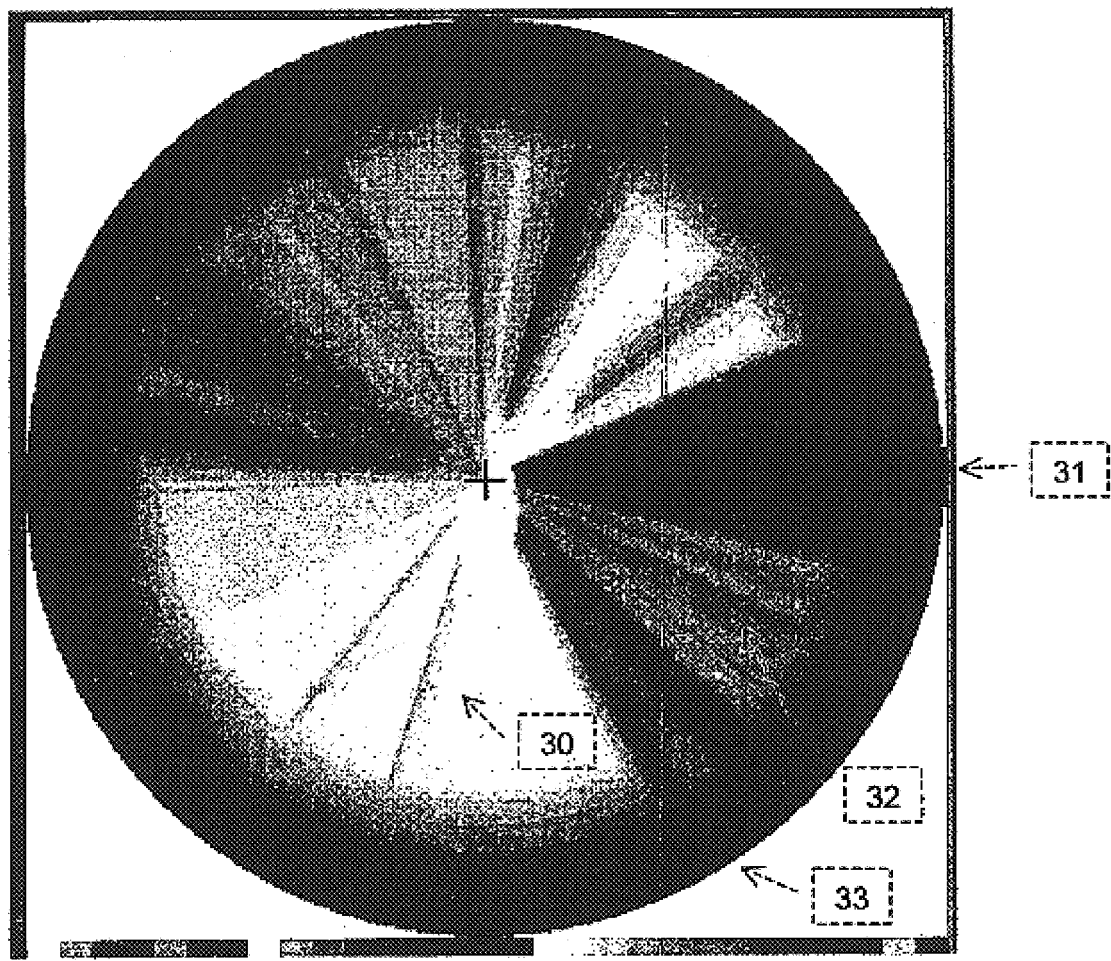
Figure 5 – Tilt 1 Radar Coverage Map for Albuquerque WSR-88D radar

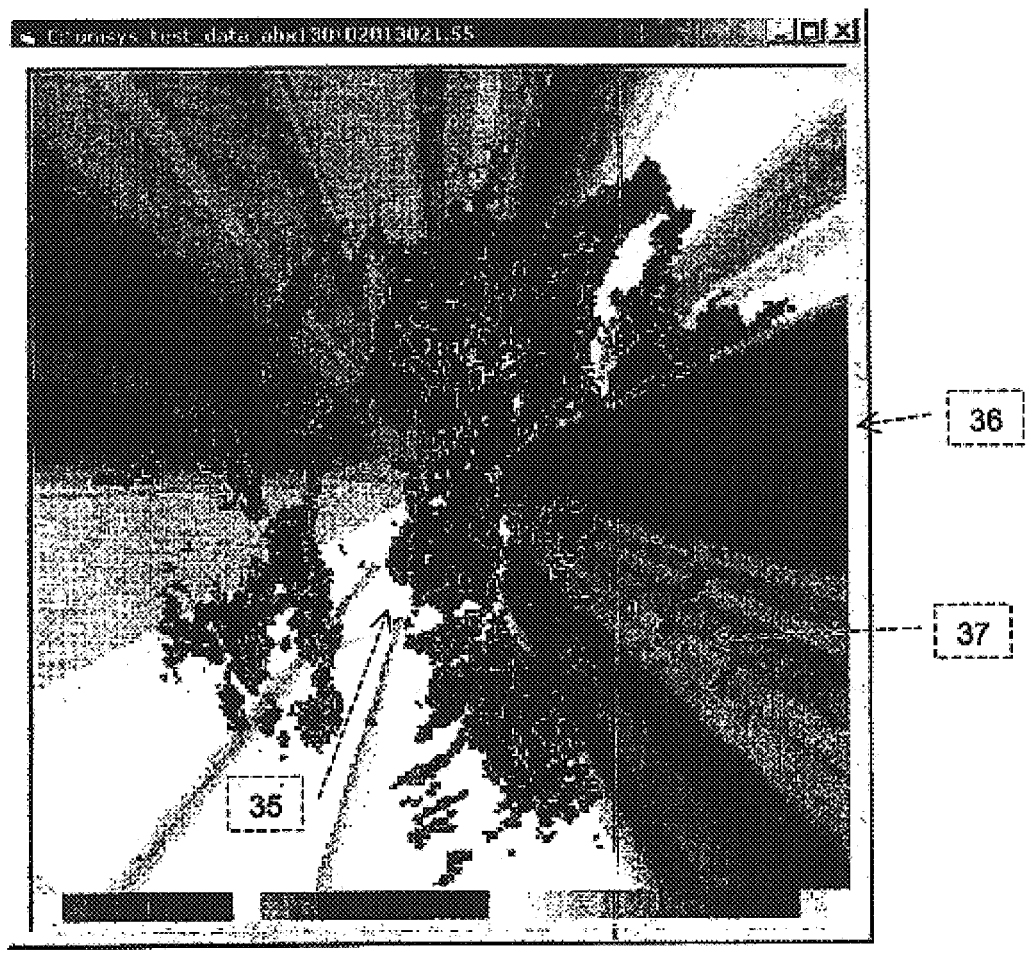
Figure 6 – Tilt 1 Reflectivity Product Overlaid on Albuquerque Radar Coverage Map

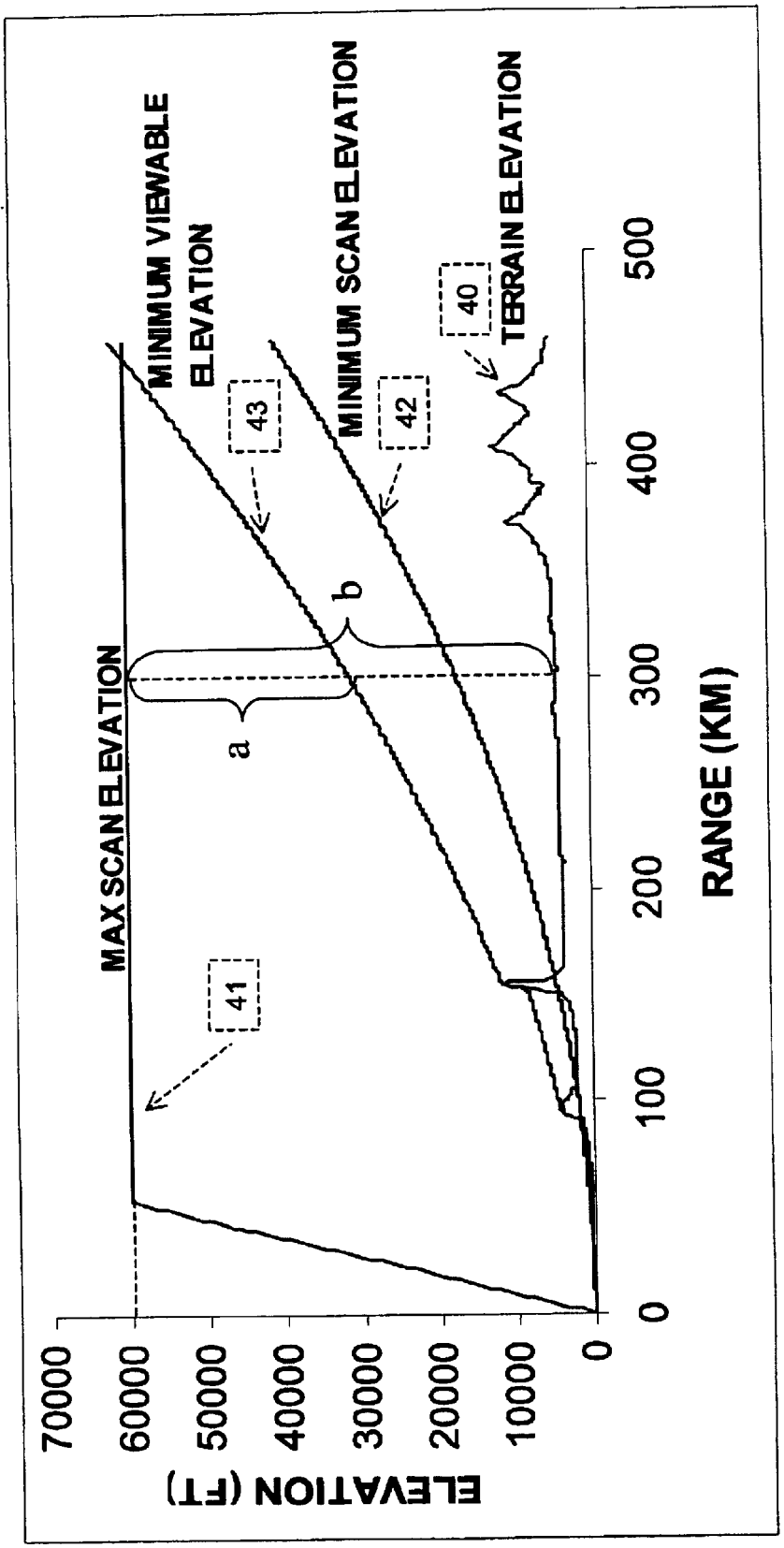
Figure 7 - Radar Coverage Map Model for Layer Radar Products

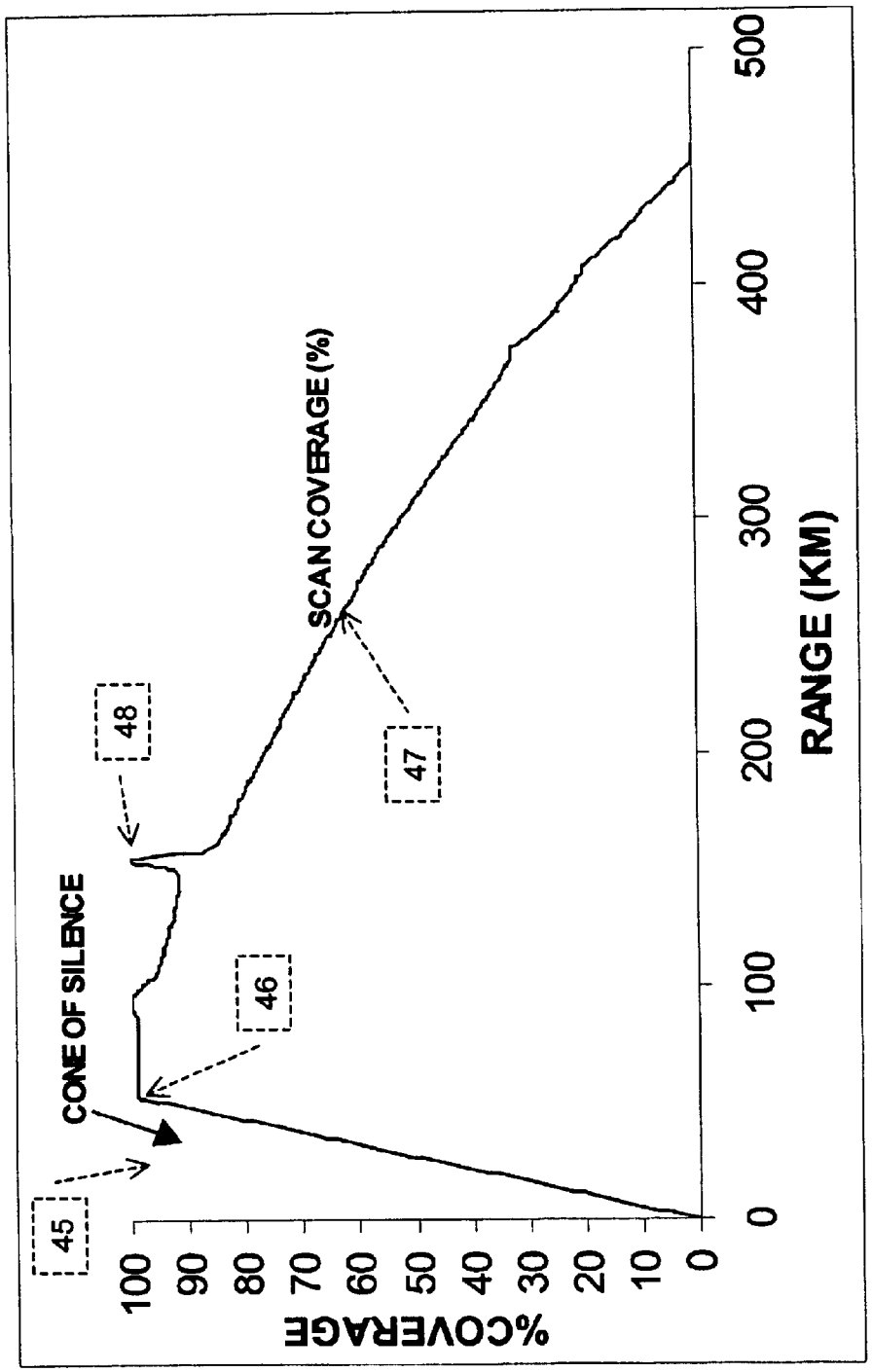
Figure 8 - Example of a Radial Radar Coverage Profile for a Layer Radar Product

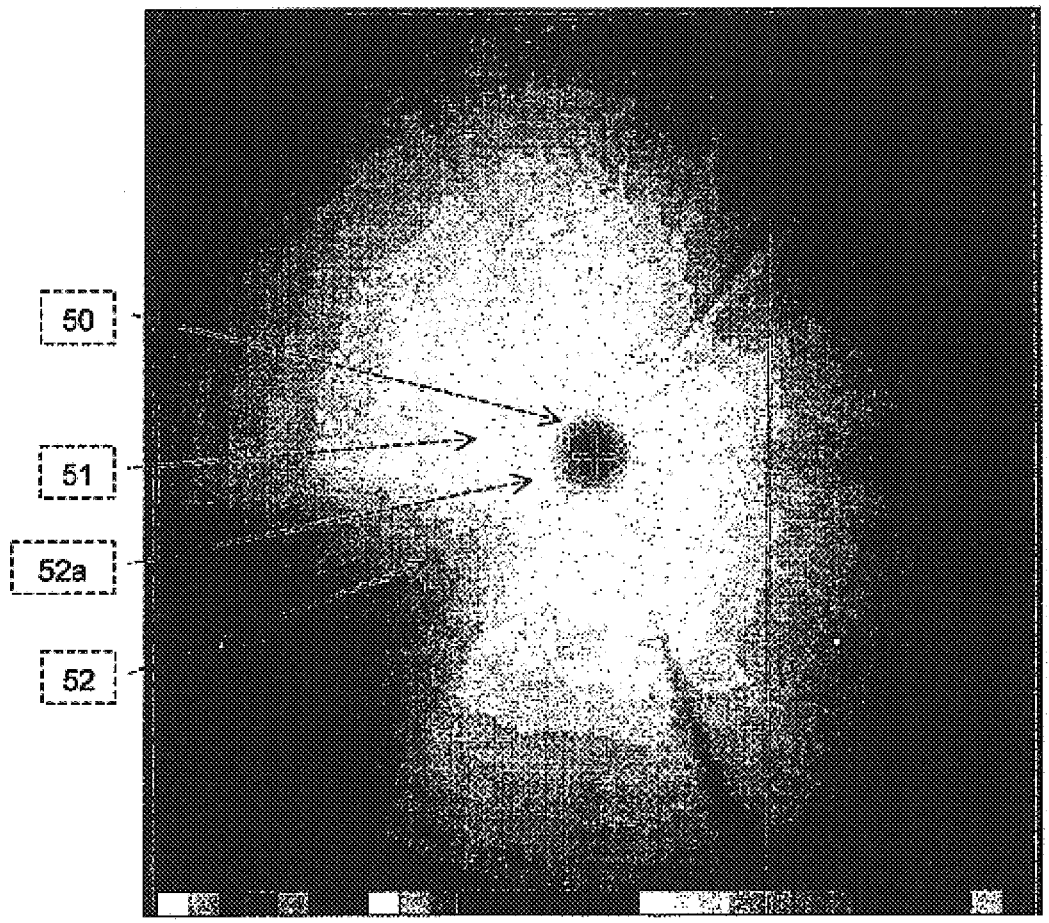
Figure 9 – Radar Coverage Map for
Composite Reflectivity Product for
Seattle WSR-88D radar

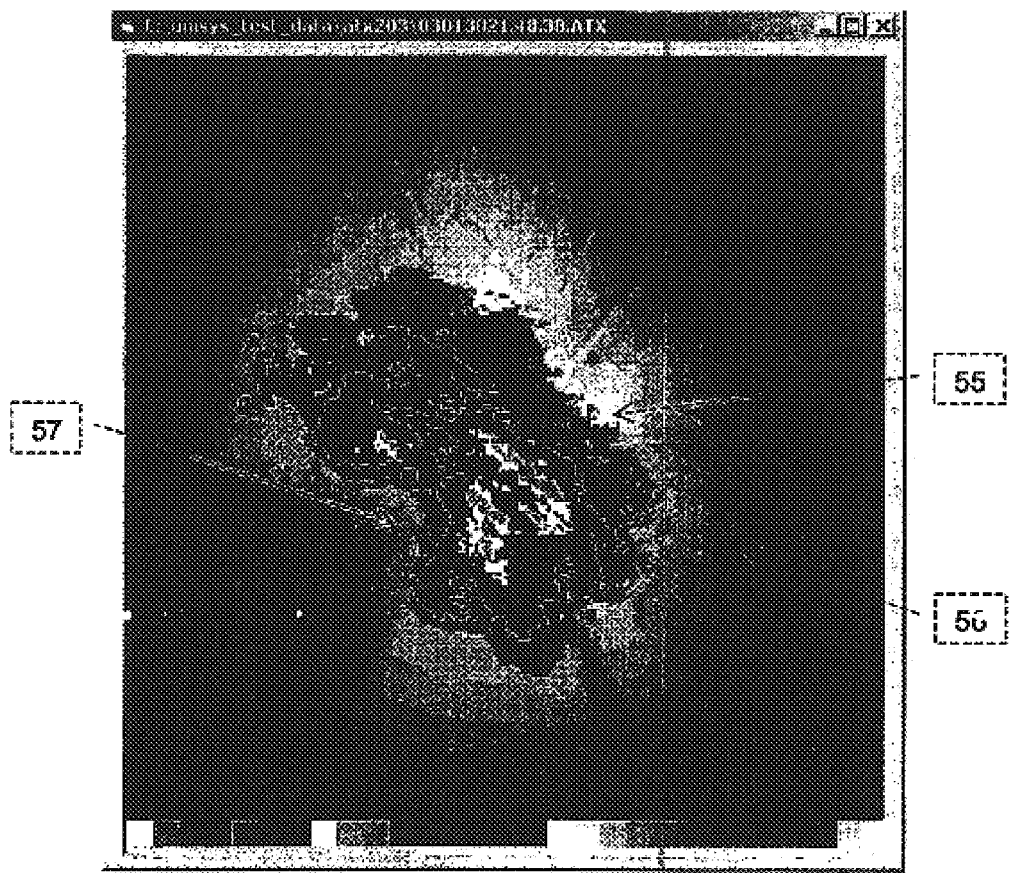
Figure 10 – Composite Reflectivity Product
Overlaid on Seattle Radar Coverage Map

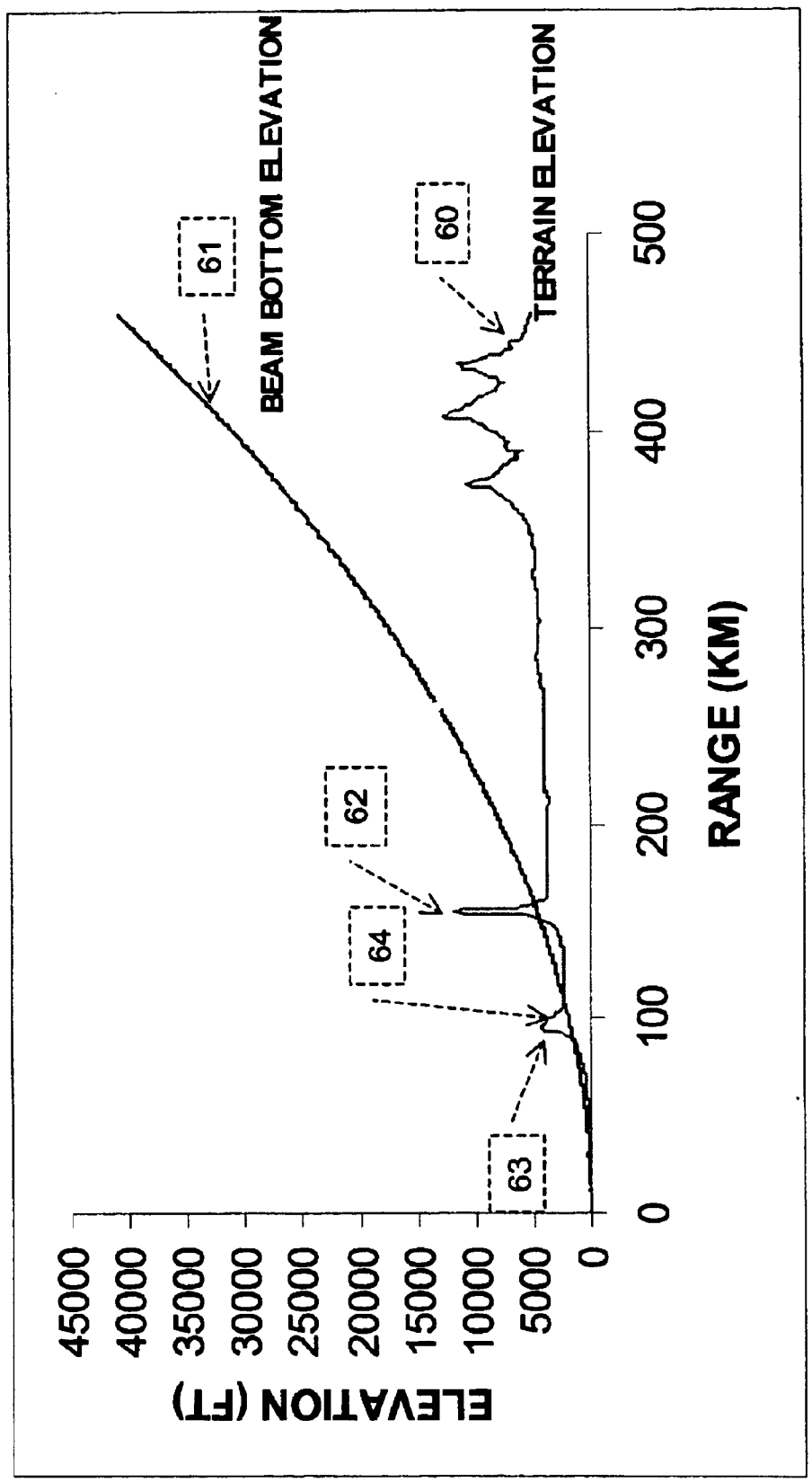
Figure 11 - Radar Clutter Region Map Model

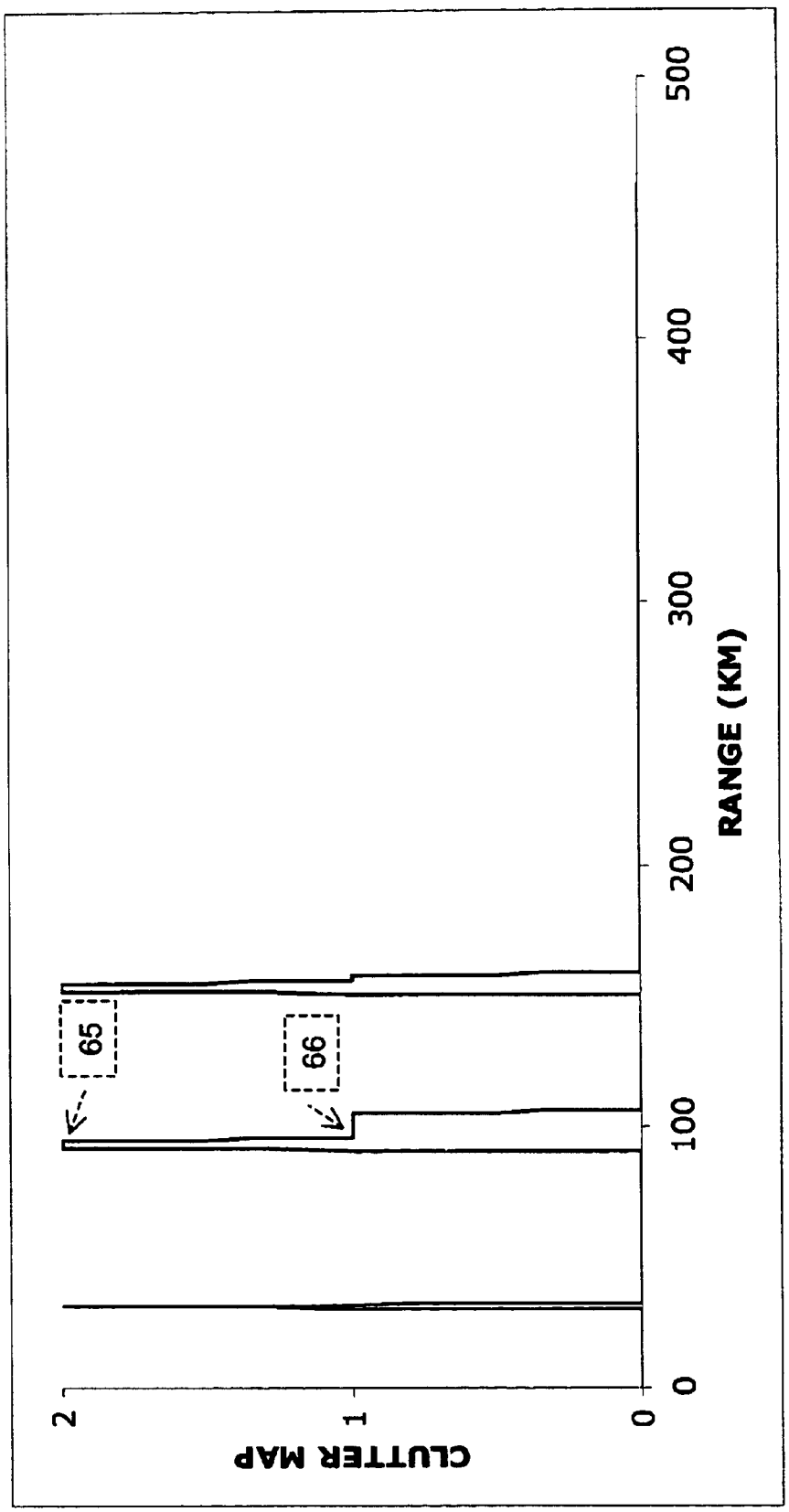
Figure 12 - Example of a Radial Clutter Profile

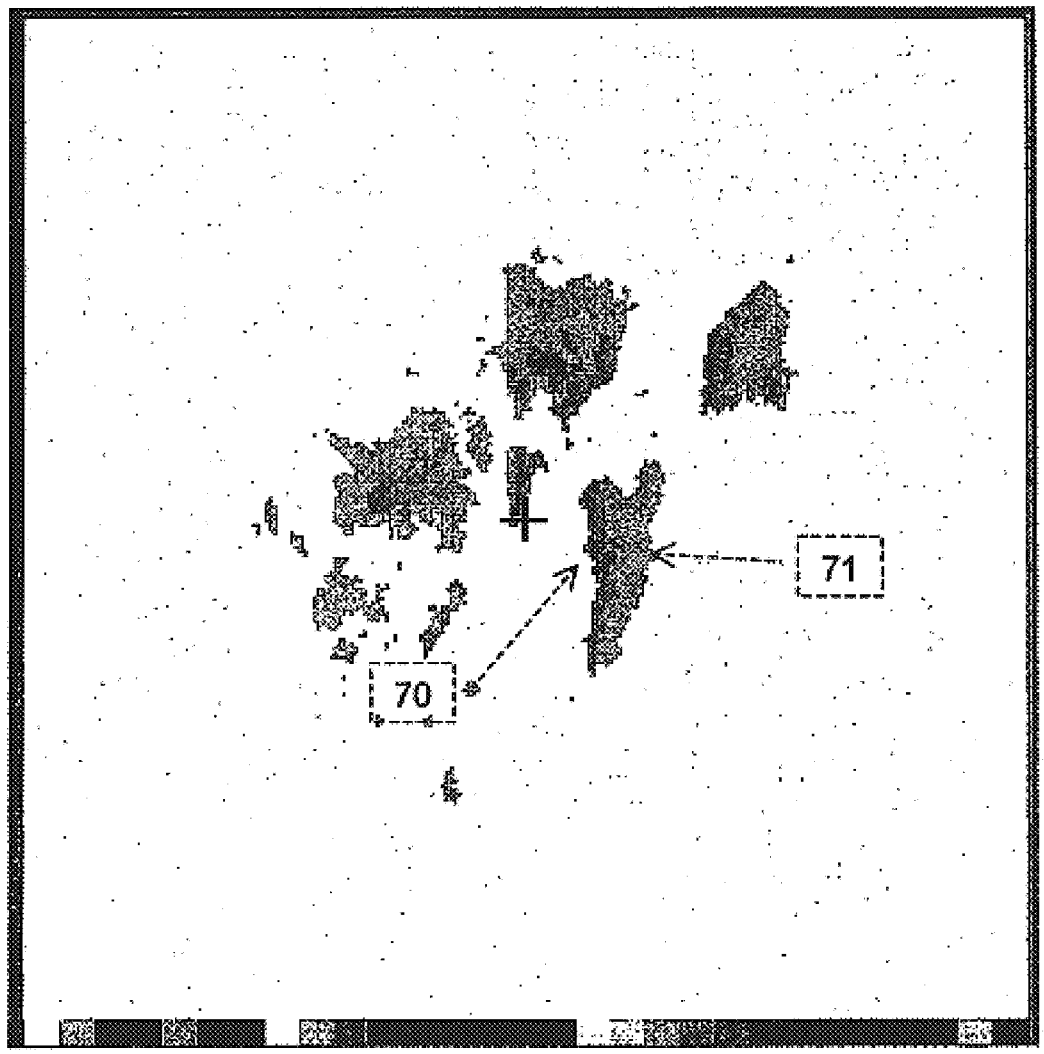
Figure 13 – Radar Clutter Region Map for Albuquerque WSR-88D radar

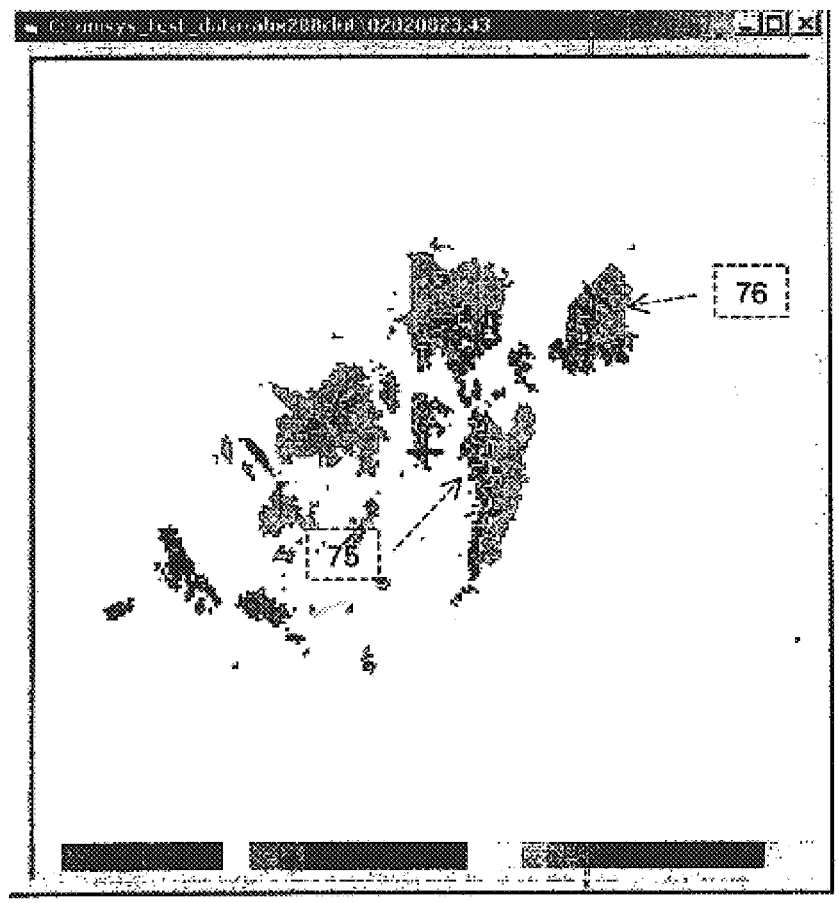
Figure 14 - Reflectivity Product Overlaid on Albuquerque Radar Clutter Region Map

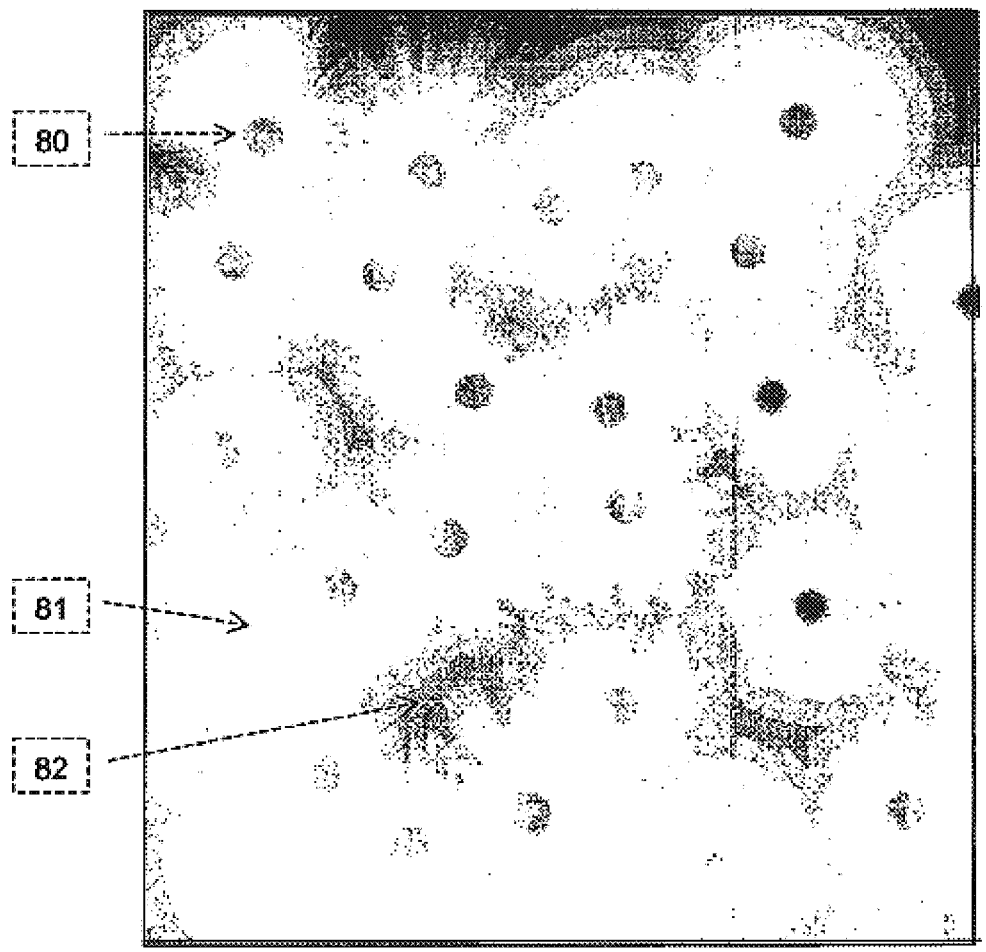
Figure 15 – Radar Coverage Map for Composite
Reflectivity Mosaic Product for
NW CONUS WSR-88D Radars

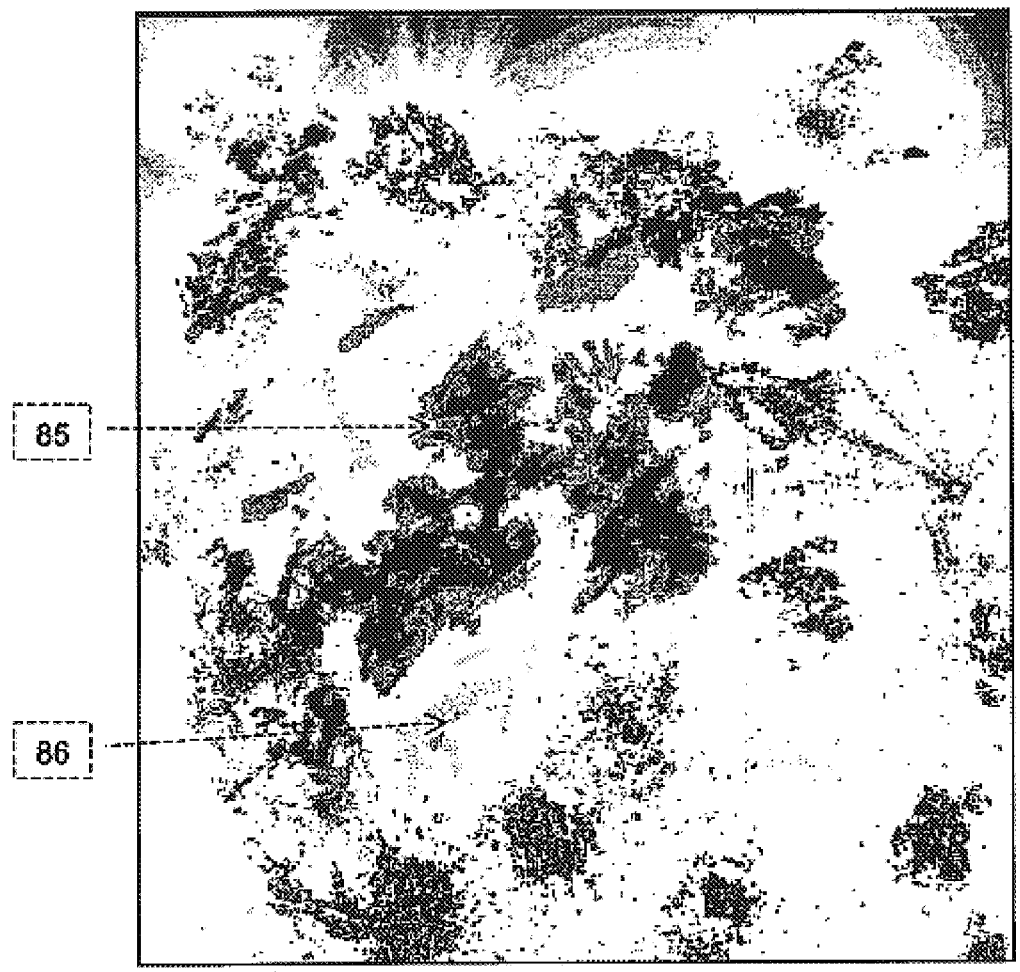
Figure 16 – Composite Reflectivity Mosaic Product Overlaid on NW CONUS Radar Coverage Map

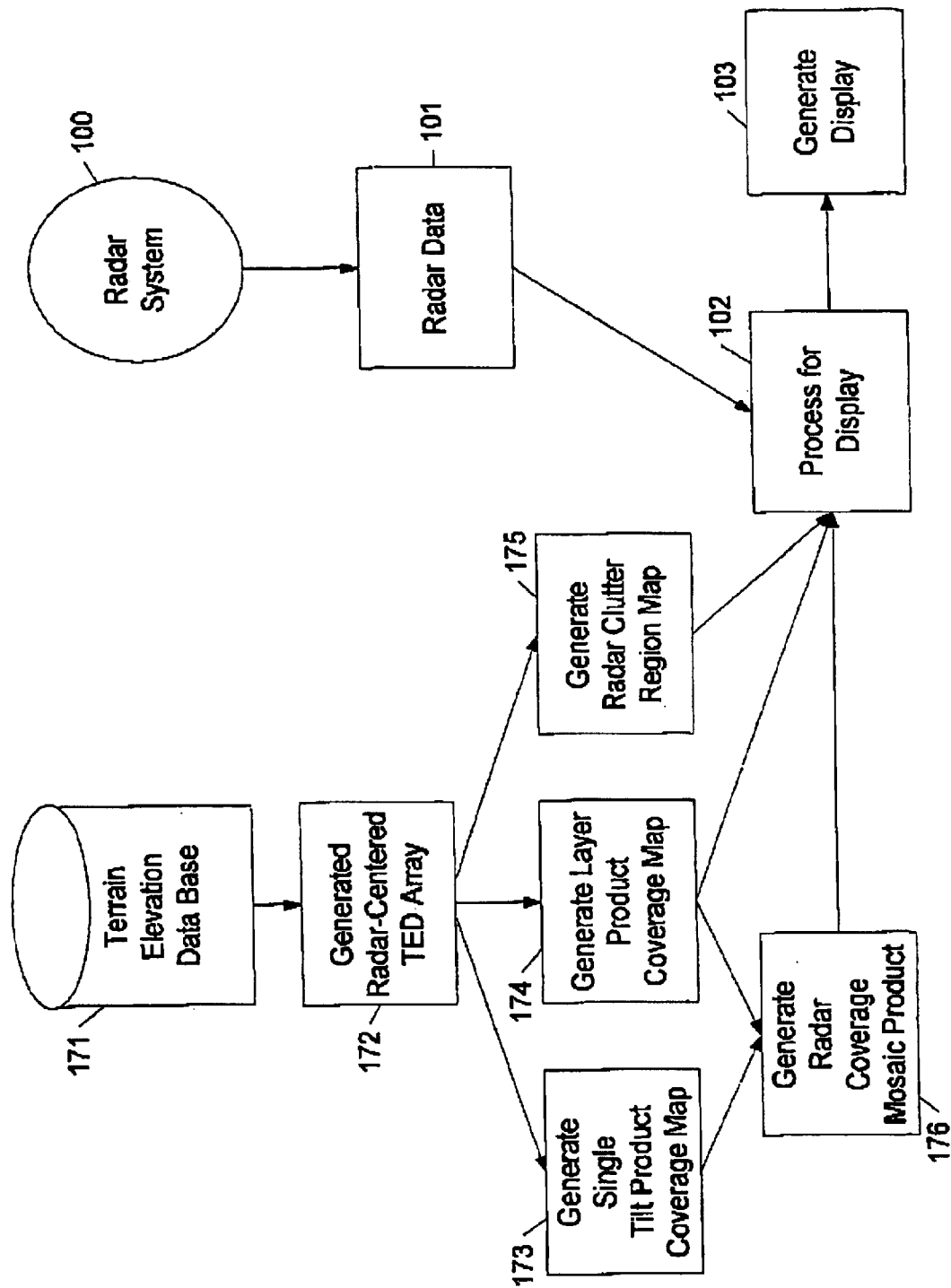
Figure 17 - Algorithmic Process Relationships

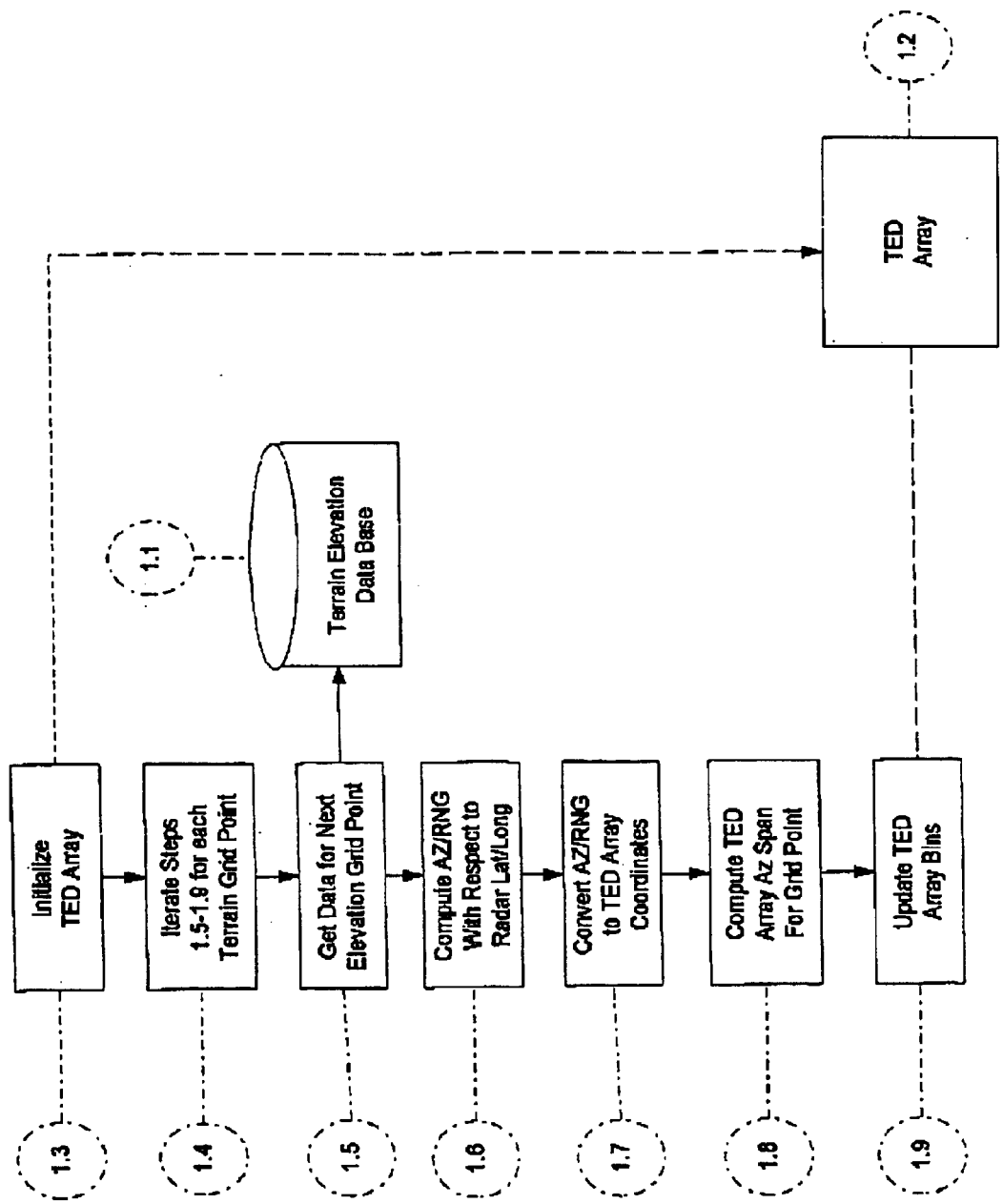
Figure 18 - Flow Diagram for Generate Maximum Terrain Elevation Data Array Algorithm

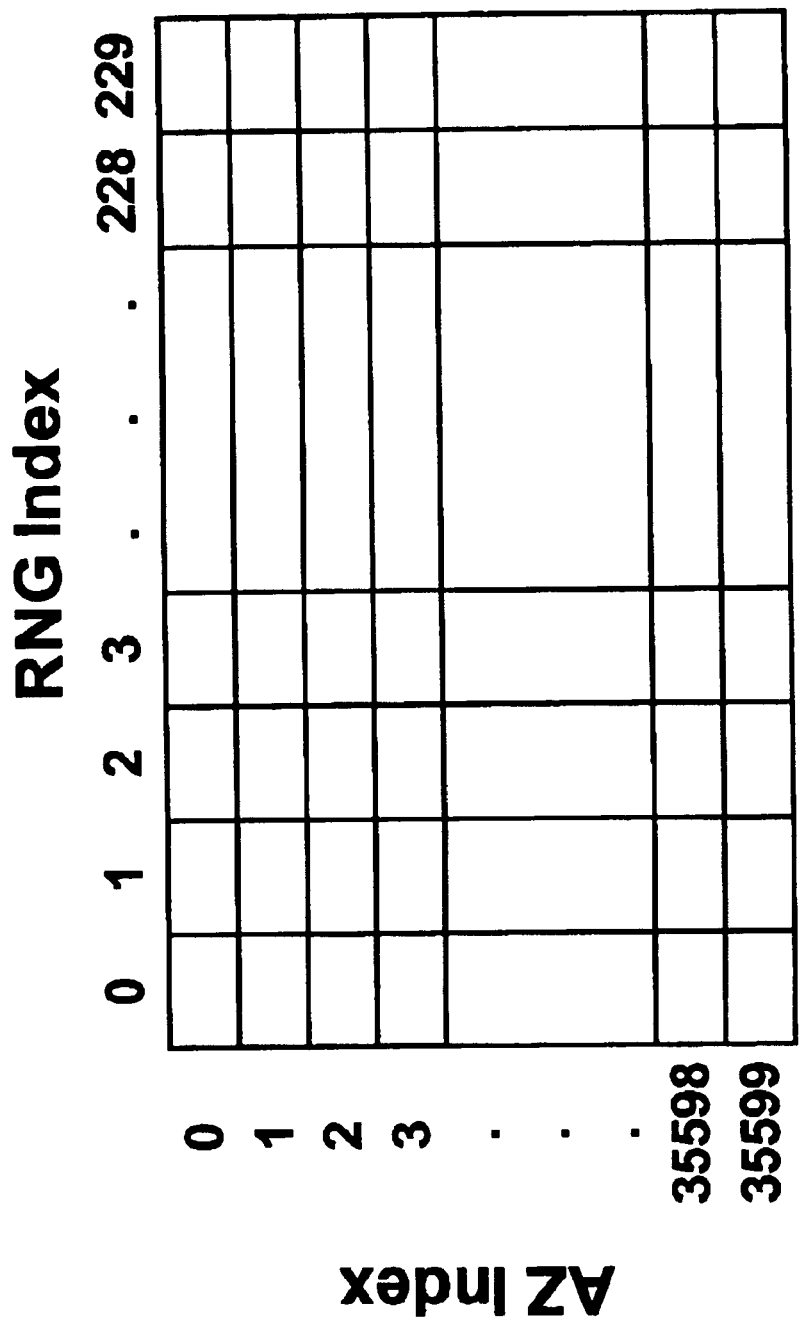
Figure 19 – Example of Maximum Terrain Elevation Data (TED) Array

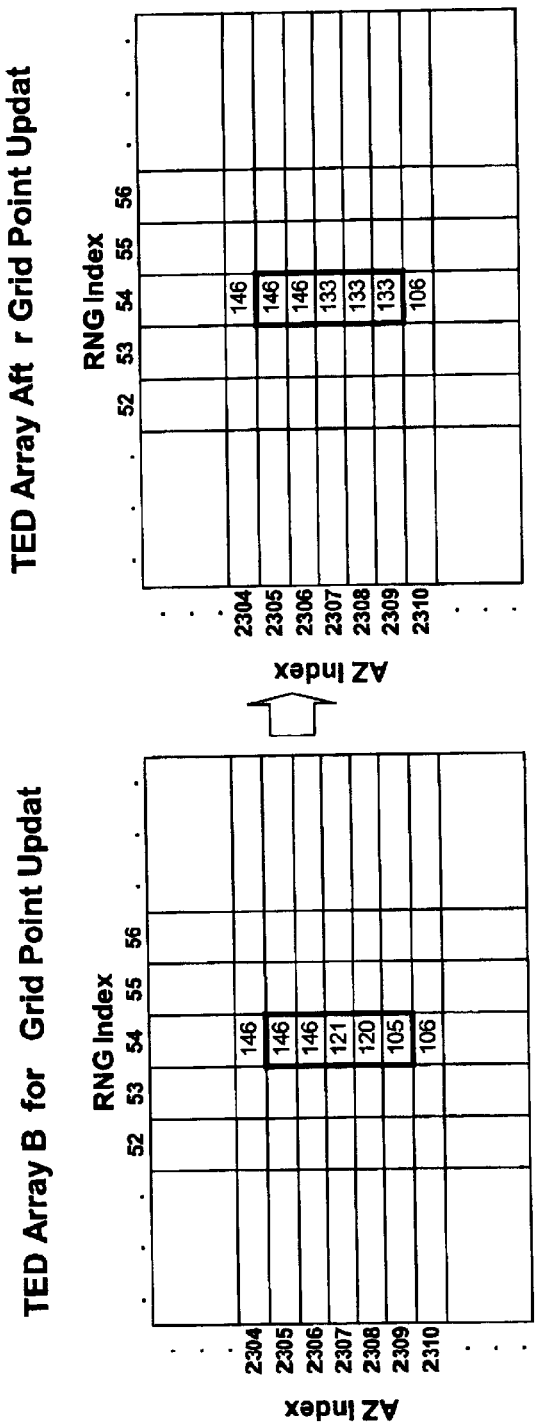
Figure 20 – Mapping of Terrain Data Base Grid Point into TED Array

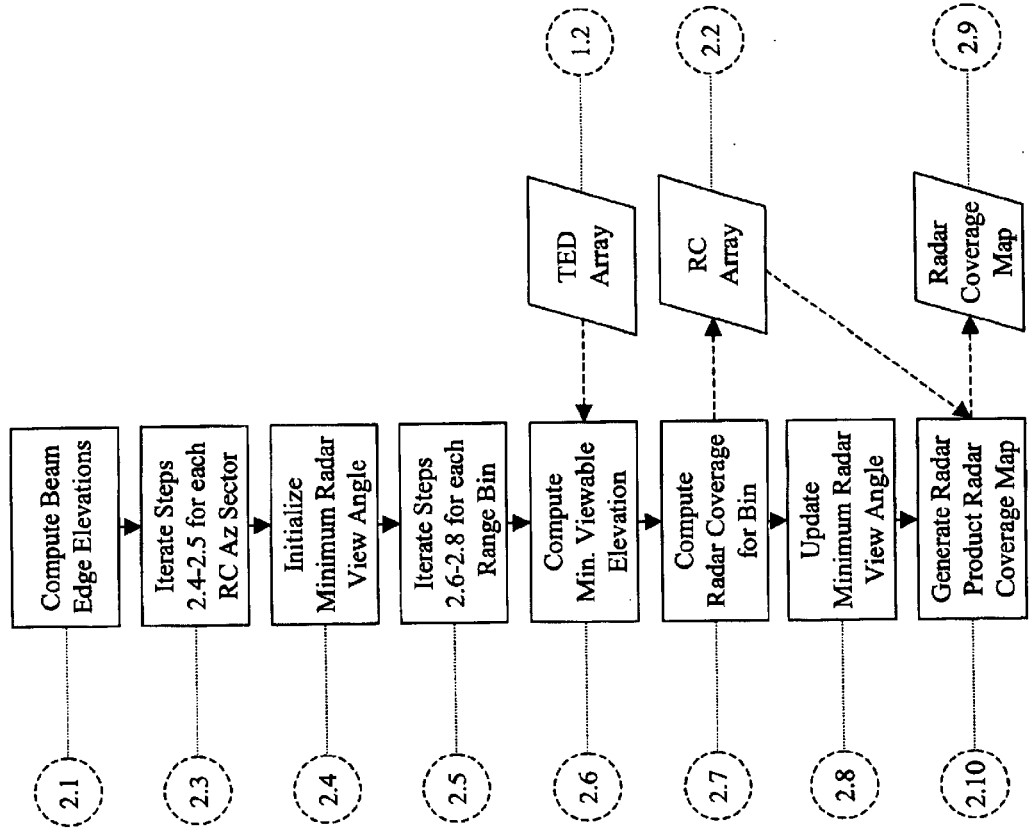
Figure 21 – Flow Diagram for Generate Radar Coverage Map for Single Tilt Radar Product Algorithm

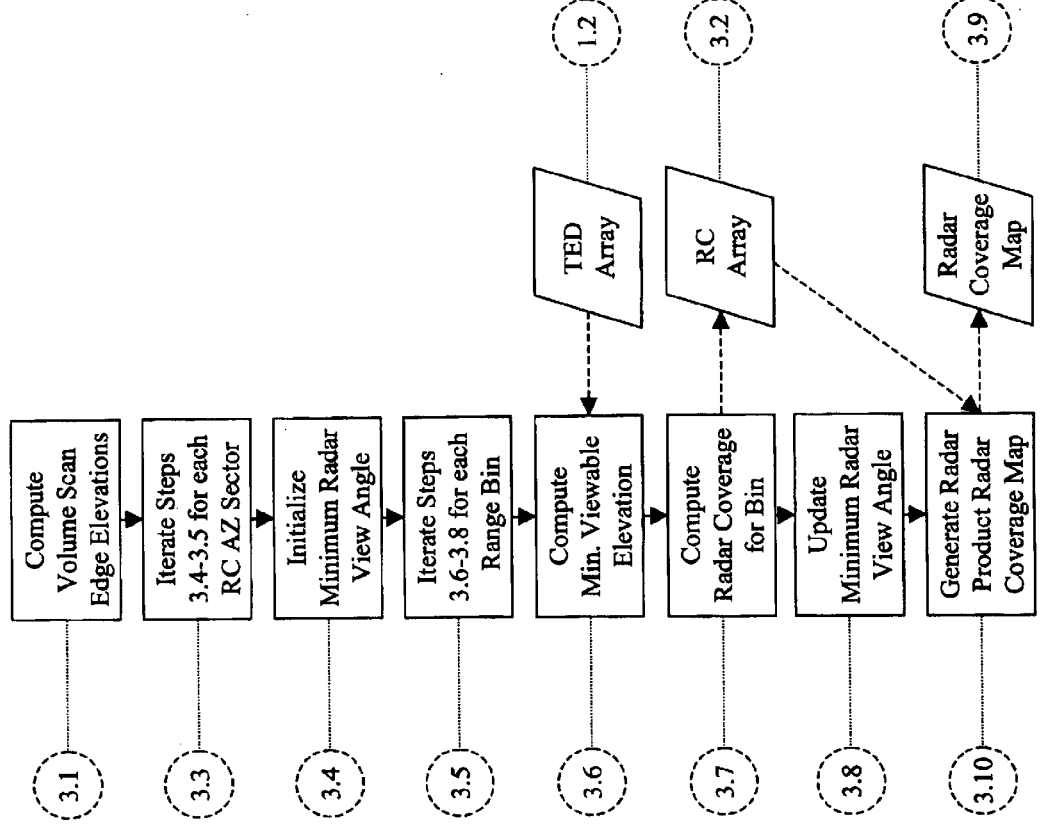
Figure 22 – Flow Diagram for Generate Radar Coverage Map for Layer Radar Product Algorithm

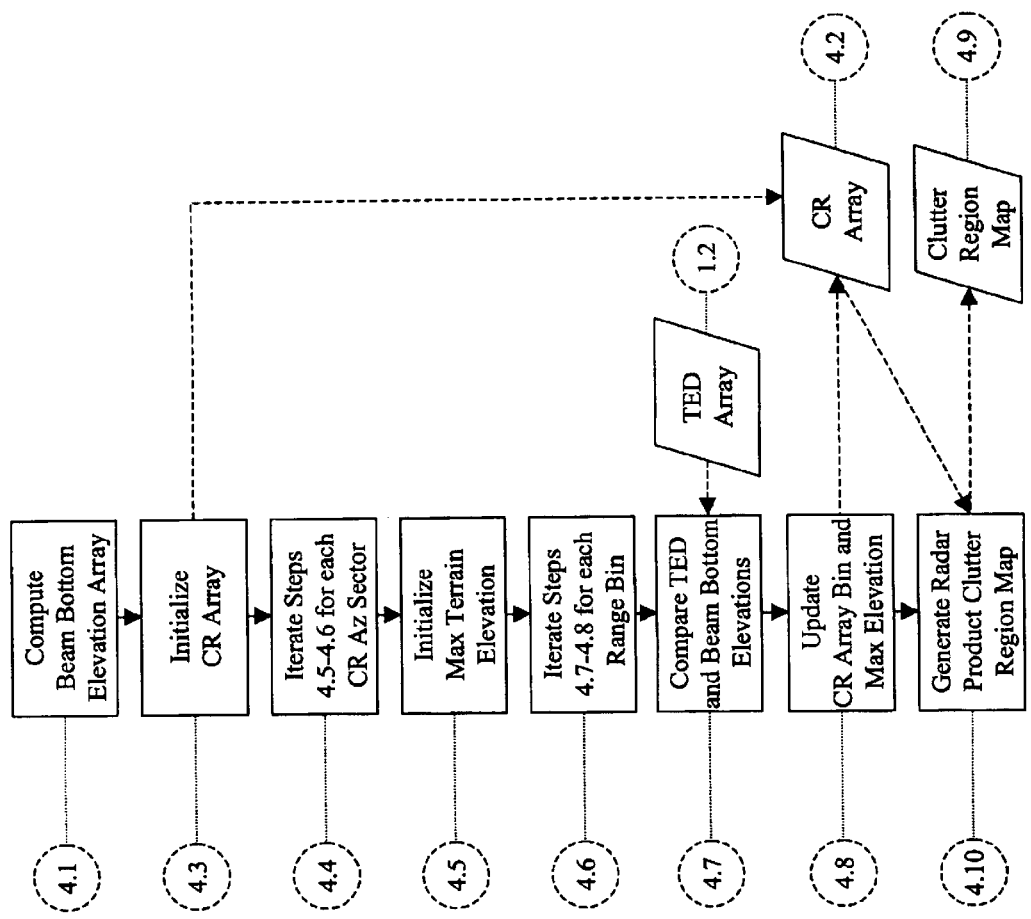
Figure 23 – Flow Diagram for Generate Radar Clutter Region Map Algorithm

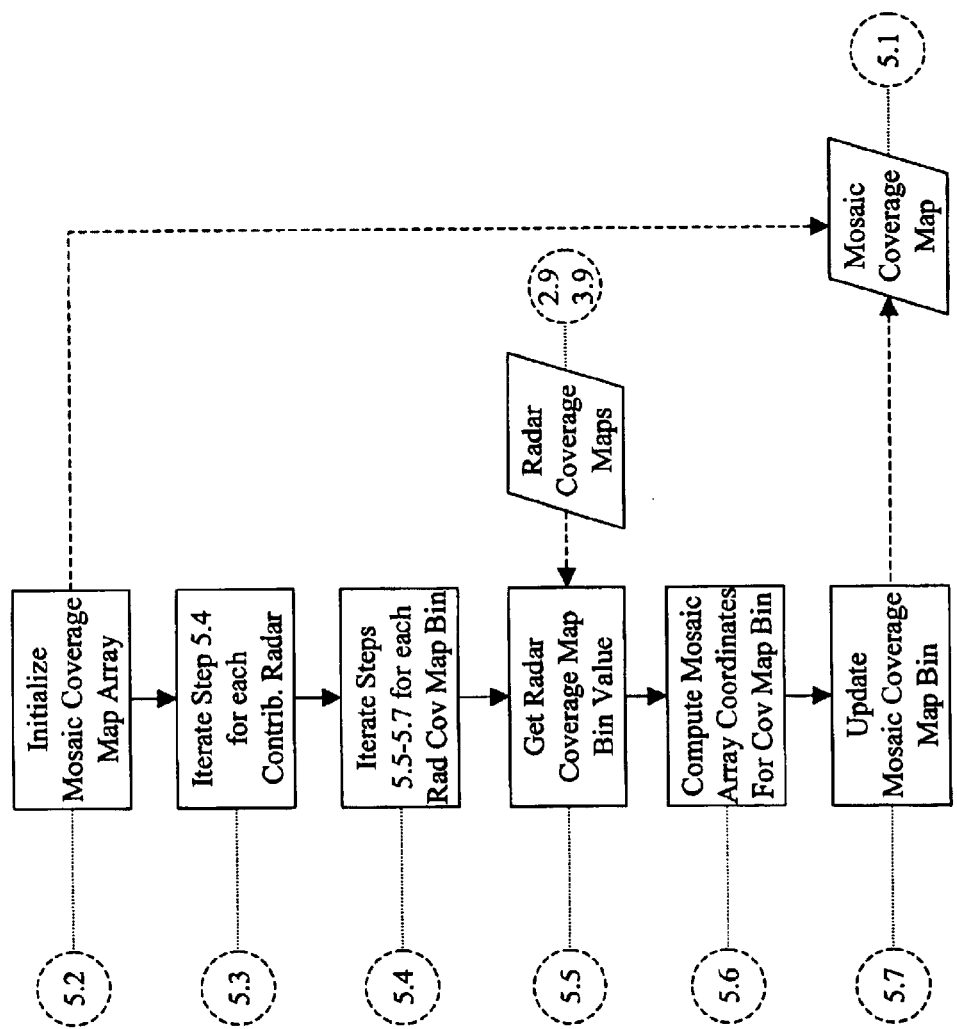
Figure 24 – Flow Diagram for Generate Radar Coverage Map for Radar Mosaic Product Algorithm

ESTABLISHING RADAR COVERAGE, BLOCKAGE, AND CLUTTER REGION MAPS FOR RADAR PRODUCT DATA BASED ON TERRAIN ELEVATION DATA

RELATED APPLICATIONS

This application is based on and claims priority from the Provisional U.S. Patent Application Ser. No. 60/446,646 filed on Feb. 11, 2003.

FIELD OF THE INVENTION

This invention relates to display and use of terrain elevation data to evaluate radar product data and is particularly applicable to fields of application where information regarding actual radar coverage is required.

BACKGROUND

Significant problems exist in the presentation, display, and interpretation of radar data that result for artifacts present in the data that are unrelated to the primary observation objective of the radar. For example, the United States Government operates a network of WSR-88D weather surveillance radars in the continental US, Alaska and Hawaii which provide real-time weather information. The data from these radars is adversely affected (as is data from other radars) by many factors. These factors include at least: terrain features, refraction of the radar beam in the atmosphere, the presence of non-meteorological scatters in the atmosphere (e.g. birds, insects, dust, ash, chaff, etc.), RF interference, signal processing protocols, solar interference, etc. Various algorithmic processes have been produced to ameliorate the effects of these factors on the radar data and radar data image displays, and in applications which utilize the radar data, with varying levels of success. For many of these processes, having an improved understanding of the radar field itself is believed to be advantageous. Accordingly, by producing radar coverage, radar blockage, and clutter region maps which can be used by these various algorithmic processes, better image data can be had, and the radar data made more useful and reliable.

The primary effects of terrain on radar data quality are unique in that they are relatively deterministic because terrain doesn't move. Therefore, we decided to evaluate how terrain elevation data can be used to assess the quality of the data generated by the WSR-88D radars.

Many of the WSR-88D radars are sited at locations where terrain features extend into the volume of the atmosphere being scanned by the radar for some portion of the lower elevation tilts. There are two primary effects of these terrain features. The most significant effect is that the ability of the radar to "see" the atmosphere behind terrain obstructions is impaired. The second effect (which is generally not as significant) is the presence of persistent ground clutter returns that contaminate the radar product data at the locations where terrain features extend into the path of the radar beam. Accordingly this invention developed and employed techniques for generating terrain-based radar coverage, radar blockage, and clutter region maps to identify regions of the radar product data that may be degraded due to the effects of terrain. The detailed description below describes the models used for generating these maps, and summarizes the results of our evaluation of the correlation between these maps and radar product data. The evaluation of the accuracy of the terrain-based radar coverage and clutter region maps indicates that they can be effectively utilized to assess the accuracy of radar product data. The detailed description of the invention and the examples provided are based on WSR-88D radar data.

The primary use of these maps is to allow for the development of improved displays for presenting and interpreting radar product data, and for development of improved algorithms that utilize these terrain-based radar coverage, blockage, and clutter region maps for more accurate processing of radar product data.

The algorithm descriptions and examples presented in this invention are based on the terrain elevation data obtained from the Digital Elevation Model (DEM) terrain elevation data base. The DEM data is derived from the National Imagery and Mapping Agency (NIMA) Digital Terrain Elevation Data (DTED) Level 1 data base. The DEM data is provided in a uniform matrix with a horizontal grid point spacing of 3 arc seconds (nominally 90 meters) and a terrain elevation resolution of one meter.

It should be recognized that the teachings of this invention can apply to other types of radars, and to other sources and resolutions of terrain elevation data, and can be extended to include other sources of elevation information of similar quality, particularly for example so-called "cultural" data bases which contain information on location and elevation of man-made structures within a radar coverage area.

SUMMARY OF THE INVENTION

By recognizing that if we generate a radar-centered maximum terrain elevation data array for a radar coverage area that we can substantially improve the qualification of radar data from such a coverage area, several applications for this qualified data become apparent. But to do so we also need to use this data to produce radar coverage, blockage, and/or clutter maps for single tilt radar products, at least. It is also and perhaps more usefully available to produce elevation layer radar products from this data as well. Further application can be had to generate radar product clutter region maps as well as radar coverage maps for radar mosaic products.

Accordingly, described herein are preferred embodiment algorithmic processes for producing such maps and illustrations of how these become useful in producing data products and radar display images, qualified by the blockage, coverage and/or clutter data produced as a result of use of the processes taught in this patent.

BRIEF DESCRIPTION OF THE FIGURES

The present invention is described with reference to the accompanying drawings.

FIG. 1 is a display of radar-centered terrain elevation data for the Albuquerque WSR-88D radar.

FIG. 2 is a heuristic sectional view of a segment of the earth and atmosphere and its physical relationship to a radar beam that illustrates a model used for computing radar coverage maps for single tilt radar products.

FIG. 3 is a graph illustrating the relationship between minimum radar view angle and terrain view angle as a function of range for the sectional view shown in FIG. 2.

FIG. 4 is a graph illustrating the radar coverage and blockage functions computed for the sectional view shown in FIG. 2 in accordance with the preferred embodiment of the invention.

FIG. 5 is a coverage map generated for the Albuquerque WSR-88D tilt 1 radar product in accordance with the preferred embodiment of the invention.

FIG. 6 shows a display of a tilt 1 reflectivity radar product data overlaid on the coverage map shown in FIG. 5 with a 2×display magnification.

FIG. 7 is a heuristic sectional view of a segment of the earth and atmosphere and its physical relationship to a radar volume scanning strategy that illustrates a model used for computing radar coverage maps for layer radar products.

FIG. 8 is a graph illustrating the radar coverage function computed for the sectional view shown in FIG. 7 in accordance with a preferred embodiment of the invention.

FIG. 9 is a radar coverage map generated for the Seattle WSR-88D composite reflectivity radar product in accordance with a preferred embodiment of the invention.

FIG. 10 shows composite reflectivity radar product data overlaid on the coverage map shown in FIG. 9.

FIG. 11 is a heuristic sectional view of a segment of the earth and atmosphere and its physical relationship to the bottom of the tilt 1 radar beam that illustrates the model used for computing radar product clutter region maps.

FIG. 12 is a graph illustrating the radial clutter function computed for the sectional view shown in FIG. 11 in accordance with a preferred embodiment of the invention.

FIG. 13 is a clutter region map generated for the Albuquerque WSR-88D radar product in accordance with a preferred embodiment of the invention.

FIG. 14 shows tilt 1 reflectivity product data overlaid on the radar clutter region map shown in FIG. 13.

FIG. 15 is a composite reflectivity radar coverage mosaic for the northwestern CONUS region generated from the set of WSR-88D composite reflectivity radar product coverage maps, in accordance with a preferred embodiment of the invention.

FIG. 16 shows a composite reflectivity mosaic product overlaid on the coverage map shown in FIG. 15.

FIG. 17 illustrates the relationship between five algorithmic processes that are used in this invention.

FIG. 18 is a flow diagram of a preferred embodiment algorithm which generates a maximum terrain elevation data.

FIG. 19 is the terrain elevation data array sized in accordance with preferred embodiment guidelines.

FIG. 20 is an illustration of how terrain elevation database grid point data is mapped into the radar-centered terrain elevation data array in accordance with a preferred embodiment of the invention.

FIG. 21 is a flow diagram of a preferred embodiment algorithm which generates radar coverage and blockage maps for single tilt radar.

FIG. 22 is a flow diagram of a preferred embodiment algorithm which generates radar coverage maps for elevation layer radar products.

FIG. 23 is a flow diagram of a preferred embodiment algorithm which generates radar product clutter region maps.

FIG. 24 is a flow diagram of a preferred embodiment algorithm which generates radar coverage maps for radar mosaic products.

DETAILED DESCRIPTION OF THE PREFERRED EMBODIMENTS

FIG. 1 illustrates a radar-centered terrain elevation map for the coverage area of the Albuquerque WSR-88D radar. This map can be produced as a display, or the data that forms it can be used directly by algorithmic processes described within. This display was generated by extracting elevation grid point data from the terrain elevation data base and converting the data into a radar-centered radial (polar) format that facilitates efficient generation of the radar coverage, blockage, and clutter region maps. This data set consists of a set of evenly spaced azimuth sectors which span 360 degrees. Each azimuth sector, or radial, is a pie-shaped wedge of the radar coverage area that is subdivided into a set of range bins spaced evenly along the radial, starting at the radar location and extending to the maximum nominal coverage range of the radar. The terrain elevation database is used to generate a terrain elevation profile for each azimuth sector as a function of distance from the radar along the radial. In this Figure, the radar location is indicated by the "+" at the center of the Figure. Terrain elevations are shown in 1000 foot increments. The darker the region in this map, the higher the terrain elevation. The details of the preferred embodiment algorithms for generating the radar-centered terrain elevation maps from terrain data base information are described below.

FIG. 2 illustrates the model used for generating radar coverage and radar blockage maps for tilt 1 WSR-88D base data products. The model takes into account the effects of terrain blockage and earth curvature in computing radar coverage maps. Radar coverage is first computed in radial (polar) data format at the same range and azimuth resolution as the radar-centered terrain elevation data. For each azimuth sector of the product, the corresponding terrain elevation information is used to generate a terrain elevation profile as a function of distance from the radar along the radial (see trace (or line) 10 in FIG. 2). For each range bin along the radial, the elevations of the upper edge (trace 11) and lower edge (trace 12) of the one-degree pencil beam are computed using the 4/3 equivalent earth radius propagation model. For tilt 1 reflectivity products, the elevation angle of the lower edge of the beam is assumed to be 0 degrees, and the elevation angle of the upper edge of the beam is 1.0 degree. The 4/3 equivalent earth radius model is used to compute terrain view angles for each range bin along the radial from the terrain elevation data. The terrain view angle data is used to determine the minimum radar view angle at each range bin along the radial. FIG. 3 illustrates the relationship between terrain view angle (trace 20) and minimum radar view angle (trace 21). The minimum radar view angle information is used to compute the minimum viewable elevation as a function of range for the radial (see trace 13 in FIG. 2).

Starting at the radar, radar coverage is computed for each range bin. The radar coverage takes into account the effects of both terrain obstructions between the bin and the radar, and earth curvature. If the terrain elevation exceeds the elevation of the lower edge of the beam at any range≦the range of the bin, the beam is considered blocked by the terrain. In the far range of the product, due to earth curvature, the radar beam rises above the elevations where weather of interest occurs; coverage in these areas is considered reduced. For the coverage map shown in FIG. 5, a maximum elevation of 40,000 ft was used (as indicated by trace 14 in FIG. 2). This maximum elevation can be adjusted based on the application of the invention. The radar coverage for a range bin is computed as follows:

% Coverage=100.*a/b where:

a Vertical extent of the beam above the minimum viewable elevation, and below the maximum elevation of interest.

b=Vertical distance between top and bottom edges of the radar beam.

A similar procedure is used for computing radar blockage. The blockage for a range bin is computed as follows:

% Blockage=100.*(1.0−a/b)

it should be noted that values can be expressed in percentage or in degree of coverage or blockage as may be desired.

FIG. 4 illustrates the radar coverage and blockage functions for the radial sector shown in FIG. 2. The radial coverage function for the radial (trace 25 in FIG. 4) decreases monotonically with increasing range from the radar. Radar coverage decreases at ranges where terrain obstructions are encountered (see area 26). Coverage remains at that level at ranges beyond the obstruction until a higher terrain obstruction is encountered (area 27), or the beam begins to pass above the maximum elevation of interest (area 28). Conversely, the radial blockage function for the radial (trace 29) increases monotonically with range. Radar blockage increases at ranges where terrain obstructions are encountered. Blockage remains at that level at ranges beyond the obstruction until a higher terrain obstruction is encountered, or the beam begins to pass above the maximum elevation of interest.

Although it is not shown in FIG. 2, complete blockage of the radar beam occurs when the terrain elevation exceeds the elevation of the upper edge of the radar beam. For this case, coverage at all ranges >the range of the obstruction is considered to be 0% (blockage=100%).

Once radar coverage functions are computed for all radial sectors of the radar product, the radar product coverage map is generated by mapping the high-resolution coverage information into a coverage map product that has the same data structure (and spatial resolution) as the radar product that it will be applied to. A similar procedure is followed for generating radar product blockage maps. Thus, overlaying the coverage map onto a display of the data becomes a very straightforward process.

An example of the kind of radar coverage map product the invention produces is illustrated in FIG. 5. FIG. 5 is a radar coverage map display for the Albuquerque WSR-88D radar tilt I base radar product. Clear areas of the map indicate radar coverage level>90%, while shades of gray indicate regions of reduced coverage. The shades of gray indicate varying levels of coverage, with lighter shades indicating areas of higher coverage and darker shades indicating areas of lower coverage. So, for example, area 30 has full radar coverage, while the dark wedge in area 31 has no radar coverage due to a mountain range close to the radar that completely blocks the radar beam in this direction. Area 32 is a region of partial coverage due to terrain features which only partially block the radar beam in this azimuth sector. The annular rings of decreasing coverage in the far range of the radar coverage area (area 33) are due to the reduction in coverage as the radar beam rises above the maximum elevation of interest (40,000 feet in this example).

An example of how the radar coverage map product the invention generates can be applied to interpret radar product data is illustrated in FIG. 6. In this Figure, a tilt 1 base reflectivity product generated by the Albuquerque WSR-88D radar is overlaid on the tilt 1 radar coverage map. This product shows an extended area of precipitation moving through the Albuquerque area. This Figure is shown at a 2×magnification. Note that the strongest weather returns occur in the regions with the highest radar coverage levels (see area 35), while weather moving through the completely blocked area to the east of the radar (see area 36) is not detected by the radar. The level of radar returns for weather moving through the partial coverage areas (see area 37) varies with the level of radar coverage.

FIG. 7 illustrates the model used for generating radar coverage and radar blockage maps for elevation layer WSR-88D products. These products are generated from data collected by the radar for multiple elevation tilts, and provide information on weather detected within a specified range of elevations in the atmosphere. The model takes into account the effects of terrain blockage and earth curvature in computing radar coverage maps. Radar coverage is first computed in radial (polar) data format at the same range and azimuth resolution as the radar-centered terrain elevation data. For each azimuth sector of the product, the corresponding terrain elevation information is used to generate a terrain elevation profile as a function of distance from the radar along the radial (trace 40 in FIG. 7). For each range bin along the radial, the elevations of the upper edge of the radar volume scanning strategy as a function of range are computed (trace 41). For each range bin, this is the minimum of the elevation of the upper edge of the highest tilt angle in the elevation scan at that range computed using the 4/3 equivalent earth radius propagation model or the elevation of the top of the layer; in FIG. 7, the top of the layer is 60000 ft.). For each range bin along the radial, the elevations of the lower edge of the lowest tilt angle are computed using the 4/3 equivalent earth radius propagation model (trace 42). The 4/3 equivalent earth radius model is used to compute terrain view angles for each range bin along the radial from the terrain elevation data. The terrain view angle data is used to determine the minimum radar view angle at each range bin along the radial. FIG. 3 illustrates the relationship between terrain view angle (trace 20) and minimum radar view angle (trace 21). The minimum radar view angle information is used to compute the minimum viewable elevation as a function of range for the radial (trace 43 in FIG. 7).

Starting at the radar, radar coverage is computed for each range bin. The radar coverage takes into account the effects of terrain obstructions and earth curvature, the radar elevation scan strategy, and the elevation layer for which the coverage map is being generated. The radar coverage for a range bin is computed as follows:

% Coverage =100.*a/b where:
a=Vertical extent between the maximum elevation scanned by radar for that range bin and the minimum viewable elevation for the range bin.
b=Vertical distance between top and bottom of the elevation layer.

In FIG. 7, the top of the layer is 60000 ft. above mean sea level, and the bottom of the layer is the surface of the earth, which are the elevation layer limits for the WSR-88D composite reflectivity product.

A similar procedure is used for computing radar blockage. The blockage for a range bin is computed as follows:

% Blockage=100.*(1.0−a/b)

It should be noted that with minor modifications, this process can be adapted to generate a map of minimum and maximum viewable elevations within a layer product, which could be useful in some applications.

FIG. 8 illustrates the corresponding radar coverage function for the radial sector shown in FIG. 7. The radar coverage is 0% at the radar and increases steadily in the cone of silence of the radar (region 45) until the top edge of the radar beam for the highest elevation tilt in the radar scan strategy passes through the top of the layer at point 46. From point 46, radar coverage gradually decreases with increasing range from the radar as the minimum viewable elevation increases due to the combined effects of terrain obstructions and earth curvature as in region 47. Note that in the range bins where radar-facing terrain obstructions are encountered, radar coverage increases to 100% because the radar can see all the layers of the atmosphere above terrain that projects into the path of the radar beam as seen in area 48.

Once radar coverage functions are computed for all radial sectors of the radar product, the radar product coverage map is generated by mapping the coverage information into a coverage map product that has the same data structure and spatial resolution as the radar product that it will be applied to. A similar procedure is followed for generating radar product blockage maps. Again, this correspondence in data structure and spatial resolution makes combining the map with the radar data straightforward and uncomplicated.

An example of the kind of layer product radar coverage map product the invention generates is illustrated in the display image of FIG. 9. FIG. 9 is a radar coverage map for the Seattle WSR-88D radar composite reflectivity radar product. The shades of gray indicate varying levels of coverage, with lighter shades indicating areas of higher coverage and darker shades indicating areas of lower coverage. So, for example, the small area of reduced coverage in the vicinity of the radar (see area 50 in FIG. 9) is the result of the cone of silence of the radar. The region of high radar coverage levels beyond the cone of silence area (see area 51), where the radar has the best view of the elevation layer. With increasing range from the radar, radar coverage gradually decreases due to the effects of earth curvature and terrain obstructions. Note the large wedge 52 of reduced coverage to the southwest of the radar that is the result of terrain blockage in area 52*a*. It should be noted that in the reduced coverage area in the cone of silence region around the radar, the radar cannot see the upper elevations of the product layer, while in the reduced coverage areas in the mid and far ranges of the product, the radar cannot see the lower elevations of the product layer.

An example of how the radar coverage map product the invention generates can be applied to interpret radar product data is illustrated in FIG. 10. In this Figure, a composite reflectivity product generated by the Seattle WSR-88D radar is overlaid on the radar coverage map shown in FIG. 9. This product shows an extended area of shallow precipitation moving through the Seattle area. Note that the strongest weather returns occur in the regions with the highest radar coverage levels (area 55). There are virtually no weather returns in the areas where radar coverage levels are lower than 70% (area 56. In these regions the radar can only see the regions of the atmosphere above the weather. Note also the radar product does not show any weather returns in the wedge of reduced coverage (area 57) to the southwest caused by terrain blockage.

FIG. 11 illustrates the model used for generating radar product clutter region maps. Clutter region maps can be used to identify regions of the radar coverage area where radar product may be contaminated by the persistent ground clutter returns, or conversely, by the signal processing artifacts that result from the removal of ground clutter returns. The clutter region map data is first computed in radial (polar) data format at the same range and azimuth resolution as the radar-centered terrain elevation data. For each azimuth sector of the map array, the corresponding terrain elevation information is used to generate a terrain elevation profile as a function of distance from the radar along the radial (trace 60). For each range bin along the radial, the elevations of the lower edge of the radar beam for the tilt 1 elevation scan (trace 61) are computed using the 4/3 equivalent earth radius propagation model. The lower edge of the beam for the tilt 1 scan is assumed to be 0 degrees. For each range bin along the radial, the terrain elevation is compared to the tilt 1 beam bottom elevation. If the terrain elevation is greater than the beam bottom elevation (see region 62), the corresponding clutter region map array bin is set to indicate that the bin may be contaminated by clutter returns. In setting clutter region map values, a distinction is made between radar-facing terrain obstructions (region 63) and terrain obstructions that face away from the radar (region 64).

FIG. 12 illustrates the radial clutter function computed for the sectional view of FIG. 1. The radial clutter function is non-zero for those range bins where the terrain elevation exceeds the tilt 1 beam bottom elevation. Note that a higher value is assigned to bins with radar-facing obstructions (such as region 65 in FIG. 12 corresponding to region 63 in FIG. 11), while a lower value is assigned to range bins where the terrain obstructions slope away from the radar (compare region 66 in FIG. 12 with the corresponding region 64 in FIG. 11).

Once clutter functions are computed for all azimuth sectors of the map array, the radar product clutter region map is generated by mapping the high-resolution clutter region map array information into a clutter region map product that has the same data structure and spatial resolution as the radar product that it will be applied to.

An example of the kind of radar clutter region map product the invention generates is illustrated in FIG. 13. FIG. 13 illustrates a radar clutter region map for the Albuquerque WSR-88D radar tilt 1 base radar product shown at 2×magnification. Clear areas of the map identify regions of the radar product that are not likely to be contaminated by persistent ground clutter returns. The shaded areas identify regions of the product that may be contaminated by persistent ground clutter returns. In the clutter regions, the darker shade of gray identifies the areas with radar-facing terrain obstructions (see area 70). The lighter shade of gray identifies regions with terrain obstructions that slope away from the radar (see area 71).

An example of how the radar clutter region map product the invention generates can be applied to interpret radar product data is illustrated in FIG. 14. In this Figure, a tilt 1 base reflectivity product generated by the Albuquerque WSR-88D radar is overlaid on the clutter region map shown in FIG. 13. This product, which is relatively clear of weather returns, shows small areas of stationary high-level radar returns (for example, see area 75 in FIG. 14) that align closely with the clutter areas identified by the clutter region map. Note that the high-level returns occur primarily in the radar-facing clutter regions (for example, see region 76).

Techniques that can be used to generate radar mosaic products from radar product data can be applied to generate radar coverage mosaic products from the radar product radar coverage maps taught by this invention. A radar coverage mosaic product can be generated from the radar product radar coverage maps by selecting the highest radar coverage value for the radar coverage mosaic bin from the set of contributing radar product radar coverage map bins. Similarly, a radar blockage mosaic product can be generated from the radar product radar blockage maps by selecting the lowest radar blockage value for the radar coverage mosaic bin from the set of contributing radar product radar blockage map bins. This technique could also be applied to clutter for producing mosaic clutter region maps using the highest value to provide the bin value for clutter in each bin.

An example of a radar coverage mosaic product generated by this invention is shown in FIG. 15. This Figure illustrates a radar coverage mosaic product generated for a regional composite reflectivity mosaic product for the northwest CONUS area. This specific coverage map mosaic is generated from the individual composite reflectivity product radar coverage maps generated by this invention for the WSR-88D radars that contribute to the mosaic product. Because of the nature of the terrain in this region, radar coverage for many of the radars which contribute to this mosaic is degraded due to the effects of terrain blockage.

The small circular areas of reduced coverage are the cones of silence for the various radars (for example, area 80 in FIG. 15, which is the cone of silence for the Seattle radar). The un-shaded areas of the map are areas where radar coverage is>90% (for example, see area 81 which corresponds to the Central Valley area of California). The shaded areas of the map are areas where radar coverage is degraded (for example, area 82, which is the High Sierras of California).

An example of how the radar coverage mosaic product the invention generates can be applied to interpret radar mosaic product data is illustrated in FIG. 16. In this Figure, a composite reflectivity mosaic product generated for the Northwest CONUS region is overlaid on the radar coverage mosaic shown in FIG. 15. This product shows an extended area of shallow precipitation (newly shaded (darker) areas) moving through the mosaic product coverage area. By comparing FIG. 16 to FIG. 15, it can be noted that most of the radar returns occur in the regions with high radar coverage levels (for example, see area 85 in FIG. 16). Note that there are virtually no weather returns in the areas with reduced radar coverage levels (for example, see area 86).

There are five preferred embodiment algorithmic processes for generating terrain-based maps that can be used for interpreting radar product data, for generating improved radar product data displays, and in applications which utilize radar product data for assessing the effects of terrain on the quality of the radar product data. The five algorithmic processes describe:

1. How to generate a radar-centered maximum terrain elevation data array.
2. How to generate radar coverage maps for single tilt radar products.
3. How to generate radar coverage maps for elevation layer radar products.
4. How to generate radar product clutter region maps.
5. How to generate radar coverage maps for radar mosaic products.

Detailed descriptions of the five algorithmic processes are included. Application of the principles defined by these algorithms may be applied to similar processes, using similar data sets without straying from the inventive concepts taught herein as will be readily recognized by one of ordinary skill in these and the programming arts. For example, where it is mentioned that an average function is used to combine data, a mean function could be used to similar effect; where it is mentioned that a particular model of the earth is used to define how a data set is manipulated, a similar model of the earth could be used with appropriate modification to the algorithm.

The functional relationships between these algorithmic processes are shown in the flowchart 170 of FIG. 17. Starting with a terrain elevation database (or if desired a similar database which, for example, could include cultural data) a radar centered data array is produced 172. From this "TED" array, a single tilt product coverage map can be produced 173. (By similar process, clutter and blockage maps can be produced as described in greater detail below). The same data can be used to generate a layer product coverage map for a radar also 174. Additionally, a radar clutter region map can be produced 175, preferably using multiple overlapping radar areas. The single radar coverage area maps produced in blocks 173 and 174 can be used to generate radar coverage mosaic products 176. Because the bins used to hold data from the various mappings produced in blocks 173–176 correspond directly to bins in the radar coverage areas, when data 101 from a radar system 100 is provided to a computer system, an overlay process 102 for producing a display can easily combine the data, so that a display can be generated 103. The system hardware needed for all these steps is most often already in place and mere software code to implement these processes is all that is newly required to accomplish these inventive functions and produce the inventive displays. A display can also be thought of as a data set, since it is mere formatting and normal computer processing, albeit in accord with the teachings of this patent that produces one from the other.

Thus, the generate terrain elevation data array process in block 172 is a computer assisted process wherein the code is applied to use the terrain elevation data base information to generate a radar-centered terrain elevation data array. This TED data provides terrain elevation data for the radar coverage area to the radar product radar coverage map generator and clutter region map generator processes, producing corresponding coverage maps. The radar product radar coverage maps generated by the coverage map generator processes provide the inputs to the mosaic product radar coverage map generator process, which produces a mosaic product radar coverage map therefrom. The maps generated by this invention can be combined with radar product data to generate enhanced radar product displays. Various combinations of these maps may be suitable for various situations.

Algorithm 1. Generate Radar-Centered Maximum Terrain Elevation Data Array

Terrain elevation data base information is not in a form that facilitates generation of terrain-based radar coverage and radar clutter region maps directly from the data base information. This function converts terrain data base information into a format that can be used efficiently by the radar coverage map and clutter region map generation functions. FIG. 18 is a flow diagram of the algorithm which generates the maximum terrain elevation data array in accordance with the preferred embodiment of the invention. The procedure for generating the radar-centered terrain elevation data array is preferably executed stepwise as follows, but variations within the ambit of this invention will occur to those of ordinary skill in these and the programming arts:

1.1

Terrain elevation databases (e.g. Digital Elevation Model (DEM) data base, but other databases of similar content could be used for other countries, locales, or even the US if available) consist of a set of data files that specify terrain elevations at regular latitude/longitude intervals. The horizontal spacing of these lat/long grid points is the resolution of the database (e.g. DEM data has a horizontal grid point spacing of approximately 90 meters; and note that there are other databases available which have varying resolution, for example 1 km spacing).

1.2

The elevation database information is used to generate a maximum terrain elevation data (TED) array. This array is a radial formatted array that specifies terrain elevations as a function of range and azimuth with respect to the radar. This array provides the terrain elevation information to the other algorithms for generating radar product coverage and clutter region maps. The array is a double indexed array: TED [RNG,AZ] (i.e., range vs. azimuth).

The range interval of the array should be <the range resolution of the radar product for which the map is being generated. For example, for a radar product with 2 km resolution, the range interval RNG_NT for the TED array should be no greater than 2 km. The range dimension (RNG_DIM) of the TED array is:

$$RNG\_DIM = (\text{maximum product data range}/RNG\_INT)$$

For example, for a maximum product data range=460 km, and RNG_INT=2 km, the range dimension of the array is 460/2=230.

In order to insure that there are no holes in the TED array data, the azimuthal resolution of the array in degrees should be:

$$AZ\_RES \leq (180/\pi)*(\text{data base resolution/maximum product data range})$$

For example, for a terrain data base resolution=90 meters, and a maximum product data range=460 km, an azimuth resolution=0.01 ≦(180/π)*(0.09/460)=0.01121 is adequate.

The azimuth dimension (AZ_DIM) of the TED array is:

$$AZ\_DIM = (360 \text{ degrees}/AZ\_RES)$$

For example, for an azimuth resolution of 0.01 degrees, the azimuth dimension of the array is: (360/0.01)=36000.

FIG. 19 illustrates the terrain elevation data array sized in accordance with the guidelines provided in the preferred embodiment of the invention for this example.

1.3

Initialize all elements of the TED array to zero.

1.4

Then for each terrain elevation database lat/long grid point that falls within the coverage range of the radar product, perform steps 1.5–1.9. Refer to FIG. 20, which is an illustration of the computations performed in mapping an elevation data base grid point information into the TED array in accordance with the preferred embodiment of the invention.

1.5

Get the grid point elevation value from the terrain elevation data base.

1.6

Compute the corresponding range and azimuth with respect to the radar lat/long position using the projection scheme used for the radar product data. For example, for the WSR-88D radar system, the Nexrad (A word standing for NEXt generation RADar) projection system is used. For other radar systems an appropriate projection scheme should be used.

1.7

Convert the computed range and azimuth coordinates to the nearest terrain elevation array index values (RNG Index and AZ Index) by dividing the range and azimuth coordinates by RNG_INT and AZ_RES, respectively and truncating the results to the nearest integer values:

$$RNG \text{ Index} = (int) (\text{range form radar}/RNG\_INT)$$

$$AZ \text{ Index} = (int) (\text{azimuth wrt radar}/AZ\_INT)$$

For example, for coordinates: range=108.673, azimuth= 23.0734, the corresponding TED array index values would be [54,2307].

1.8

In general, an elevation database grid point spans multiple TED array azimuth bins at that range. The number of bins spanned by a data base grid point is inversely proportional to the range of the grid point from the radar. Compute the number of TED array azimuth bins spanned by the data base grid point as follows and round up to the nearest integer:

$$AZ\_SPAN = (\text{round up}) (180/\pi)*(\text{data base resolution/range})/AZ\_RES$$

For example, at a range of 108.673 km from the radar, a 90 meter terrain data base grid point spans 5 TED array azimuth bins centered on the array location [54,2307].

1.9

The data base grid point elevation value is used to update each of the TED array bins in the range [54,2305]–[54,2309] as follows: if the elevation value for the grid point exceeds the current value of the TED array bin, set the TED array bin equal to the grid point elevation value.

In general, multiple terrain elevation database grid points map to each elevation array bin. After all of the data base grid points have been mapped to the TED array, the resulting value of a particular TED array bin will be the maximum of all the data base grid points that map to the TED array bin.

Algorithm 2. Generate Radar Coverage Maps for Single Tilt Radar Products

For single tilt radar products the range of elevations actually scanned by the radar depends on a variety of factors including: radar site elevation, radar antenna tilt angle, antenna beam width, range from the radar, curvature of the earth, terrain elevations, and refraction of the radar beam as it propagates through the atmosphere. The algorithm for generating radar coverage maps (and radar blockage maps) for these products takes these factors into account. An alternate representation of the coverage map is a radar blockage map. The algorithms for computing both radar coverage and radar blockage are included. FIG. 21 is a flow diagram of the algorithm which generates radar coverage and blockage maps for single tilt radar products in accordance with the preferred embodiment of the invention. The procedure for generating radar coverage maps for a single tilt radar product is preferably executed stepwise as follows, but variations within the ambit of this invention will occur to those of ordinary skill in these and the programming arts:

2.1

Compute the elevation above mean sea level of the upper and lower edges of the radar beam for the elevation tilt for each range interval of the TED array. These are one dimensional arrays (BEAM_TOP_EL and BEAM_BOT_EL) of length RNG_DIM. Beam elevations are computed using the 4/3 equivalent earth radius propagation model (see: Doppler Radar and Weather Observations, $2^{nd}$ Edition, Richard J. Doviak/Dusan S. Zirnic, Section 2.2.3 which describes this model). In performing these computations, the elevation angle for the upper edge of the radar beam is equal to the radar product tilt elevation angle of the antenna plus half of the antenna vertical beam width; the elevation angle for the lower edge of the radar beam is equal to the radar product tilt elevation angle of the antenna minus half of the antenna vertical beam width. The radius parameter is the sum of the earth radius, the radar site elevation above mean sea level, and the height above ground at the center of the radar antenna. The range value is the range from the radar at the center of the range interval. These radar beam elevation profiles need only be computed once for the radar product because they are azimuth-invariant.

2.2

A radar coverage array (RC) is defined with the same dimensions as the TED array, i.e. the RC array is dimensioned as follows: RC[RNG_DIM, AZ_DIM].

The TED, BEAM_TOP_EL and BEAM_BOT_EL arrays are used to compute the RC array values as follows:

2.3

For each azimuth sector (AZ) of the RC array, perform steps 2.4–2.5:

2.4

Initialize the minimum radar view angle (MIN_VIEW_ANG) to the radar product tilt elevation angle of the antenna minus half of the antenna vertical beam width, i.e. the bottom of the radar beam.

2.5

For each range bin (RNG) of the azimuth sector starting at the radar, perform steps 2.6–2.8:

2.6

Compute the minimum viewable elevation above mean sea level for the bin (MIN_VIEW_EL) using the current value of MN_VIEW_ANG as the view angle. Use the 4/3 equivalent earth radius propagation model. The range value is the range from the radar to the center of the bin.

2.7

Compute the value for the RC bin as follows:

$$RC[RNG,AZ]=100\%*(min(BEAM\_TOP\_EL[RNG], MAX\_EL)-max(MIN\_VIEW\_EL, TED[RNG,AZ])/(BEAM\_TOP\_EL[RNG]-BEAM\_BOT\_EL[RNG])$$

Where:

MAX_EL is the maximum elevation of interest (e.g. 40,000 ft)

If RC[RNG,AZ]<0%, then set RC[RNG,AZ]=0%

2.8

If the TED[RNG,AZ] value is greater than the MIN_VIEW_EL value computed for the bin (the terrain at this range extends further into the radar beam), use the TED[RNG,AZ] elevation value to compute a new minimum radar view angle to be used for the remaining range bins of the azimuth sector. Use the inverse equation for the 4/3 equivalent earth radius propagation model to compute the view angle from the elevation angle. Set MN_VIEW_ANG to the computed view angle.

2.9

A radar product coverage map is then generated from the RC array data. The coverage map has the same spatial resolution and dimensions as the corresponding radar product. The coverage map bin specifies the percent of radar coverage for the corresponding radar product bin.

2.10

Map the RC array data into the radar product coverage map. In general, there are many RC array bins that map to each coverage map bin. The coverage map bin value is the average of the coverage values of all of the RC array bins that map to the coverage map bin. The mapping of the radial formatted (polar coordinates) RC array data into the coverage map depends on the format of the radar product data (radial or raster). The procedures for doing this are straightforward.

An alternate representation of the radar coverage map is a radar blockage map which specifies the percentage of radar beam blockage for each radar product bin. The blockage map, which has the same spatial resolution and dimensions as the coverage map, is generated from the coverage map data by setting each blockage map bin to a value: (100%—value of the corresponding coverage map bin).

Algorithm 3. Generate Radar Coverage Maps for Elevation Layer Radar Products

Layer radar products, which include data from multiple elevation tilts, contain radar returns detected at a range of altitudes, i.e. surface to 60,000 ft, surface to 24,000 ft, 24,000 ft to 33,000 ft, etc. The algorithm for generating radar coverage maps (and radar blockage maps) for these products is similar to the algorithm for generating maps for single tilt radar products. The coverage map bin values for layer radar products specify the percentage of the elevation layer that is actually viewed by the radar for the corresponding radar product bin. The blockage map bin values for these products specify the percentage of the elevation layer that is obscured from view by the radar for the corresponding radar product bin. FIG. 22 is a flow diagram of the algorithm which generates radar coverage and blockage maps for elevation layer radar products in accordance with the preferred embodiment of the invention. The procedure for generating radar coverage maps for a layer radar product is preferably executed stepwise as follows, but variations within the ambit of this invention will occur to those of ordinary skill in these and the programming arts:

3.1

Compute the elevation above mean sea level of the upper edge of the radar beam for the highest elevation tilt in the radar scan strategy and lower edge of the radar beam for the lowest elevation tilt of the radar scan strategy for each range interval of the TED array. These are one-dimensional arrays (SCAN_TOP_EL and SCAN_BOT_EL) of length RNG_DIM. Beam elevations are computed using the 4/3 equivalent earth radius propagation model (see: Doppler Radar and Weather Observations, $2^{nd}$ Edition, Richard J. Doviak / Dusan S. Zirnic, Section 2.2.3). In performing these computations, the elevation angle for the upper edge of the scan strategy is equal to the highest tilt elevation angle plus half of the antenna vertical beam width; the elevation angle for the lower edge of the scan strategy is equal to the lowest tilt elevation angle minus half of the antenna vertical beam width. The radius parameter is the sum of the earth radius, the radar site elevation above mean sea level, and the height above ground at the center of the radar antenna. The range value is the range from the radar to the center of the range interval. These scan elevation profiles need only be computed once for the scan strategy because they are azimuth-invariant.

3.2

A radar coverage array (RC) is defined with the same dimensions as the TED array, i.e. the RC array is dimensioned as follows: RC[RNG_DIM, AZ_DIM].

The TED, SCAN_TOP_EL and SCAN_BOT_EL arrays are used to compute the RC array values as follows:

3.3

For each azimuth sector (AZ) of the RC array, perform steps 3.4–3.5:

3.4

Initialize the minimum radar view angle (MIN_VIEW_ANG) to the lowest tilt elevation angle minus half of the antenna vertical beam width, i.e. the bottom of the radar beam for the lowest tilt.

3.5

For each range bin (RNG) of the azimuth sector starting at the radar, perform steps 3.6–3.8:

3.6

Compute the minimum viewable elevation above mean sea level for the bin (MIN_VIEW_EL) using the current value of MIN_VIEW_ANG as the view angle. Use the 4/3 equivalent earth radius propagation model. The range value is the range from the radar to the center of the bin.

3.7

Compute the value for the RC bin as follows:

$$RC[RNG,AZ]=100\%*(min(SCAN\_TOP\_EL[RNG], MAX\_LAYER\_EL)-max(MIN\_LAYER\_EL, max(MIN\_VIEW\_EL, TED[RNG,AZ]))/(MAX\_LAYER\_EL-max(TED[RNG,AZ]MIN\_LAYER)$$

Where:

MAX_LAYER_EL is the elevation of the top of the layer

MIN_LAYER_EL is the elevation of the bottom of the layer

If RC[RNG,AZ]<0%, then set RC[RNG,AZ]=0%

3.8

If the TED[RNG,AZ] value is greater than the MIN_VIEW_EL value computed for the bin (the terrain at this range extends further into the radar beam), use the TED[RNG,AZ] elevation value to compute a new minimum radar view angle to be used for the remaining range bins of the azimuth sector. Use the inverse equation for the 4/3 equivalent earth radius propagation model to compute the view angle from the elevation angle. Set MIN_VIEW_ANG to the computed view angle.

3.9

A radar product coverage map is then generated from the RC array data. The coverage map has the same spatial resolution and dimensions as the corresponding radar product. The coverage map bin specifies the percent of radar coverage for the corresponding radar product bin.

3.10

Map the RC array data into the radar product coverage map. In general, there are many RC array bins that map to each coverage map bin. The coverage map bin value is the average of the coverage values of all of the RC array bins that map to the coverage map bin. The mapping of the radial formatted (polar coordinates) RC array data into the coverage map depends on the format of the radar product data (radial or raster). The procedures for doing this are straightforward.

An alternate representation of the radar coverage map is a radar blockage map which specifies the percentage of radar beam blockage for each radar product bin. The blockage map, which has the same spatial resolution and dimensions as the coverage map, is generated from the coverage map data by setting each blockage map bin to a value: (100%—value of the corresponding coverage map bin).

Algorithm 4. Generate Clutter Region Maps for Radar Products

The radar product clutter region map identifies those regions of a radar product which may be affected by persistent ground clutter returns. FIG. 23 is a flow diagram of the algorithm which generates radar product clutter region maps in accordance with the preferred embodiment of the invention. The procedure for generating radar product clutter region maps is preferably executed stepwise as follows, but variations within the ambit of this invention will occur to those of ordinary skill in these and the programming arts:

4.1

Compute the elevation above mean sea level of the lower edge of the radar beam for the lowest elevation tilt for each range interval of the TED array. This is a one dimensional array (BEAM_BOT_EL) of length RNG_DIM.

For each range interval of the BEAM_BOT_EL array, the elevation above mean sea level for the lower edge of the radar beam is computed using the 4/3 equivalent earth radius propagation model (see: Doppler Radar and Weather Observations, $2^{nd}$ Edition, Richard J. Doviak/Dusan S. Zirnic, Section 2.2.3). In performing these computations, the elevation angle for the lower edge of the radar beam is equal to the tilt elevation angle of the antenna for the lowest tilt minus half of the antenna vertical beam width. The radius parameter is the sum of the earth radius, the radar site elevation above mean sea level, and the height above ground at the center of the radar antenna. The range value is the range from the radar to the center of the range interval. This radar beam elevation profile need only be computed once for the radar product because it is azimuth-invariant.

4.2

The clutter region data array (CR) is defined with the same dimensions as the TED array, i.e. the CR array is dimensioned as follows: CR[RNG_DIM, AZ_DIM].

4.3

Initialize all bins of the CR array to a value indicating a "no clutter" condition. A value of zero is used to indicate a "no clutter" condition.

4.4

For each azimuth sector index (AZ_IDX) of the CR array, perform steps 4.5–4.6:

4.5

Initialize the maximum azimuth sector terrain elevation (MAX_EL) to 0.

4.6

For each range bin index (RNG_IDX) of the CR array, perform steps 4.7–4.8:

4.7

Compare the TED[RNG_IDX,AZ_IDX] value to the corresponding BEAM_BOT_EL[RNG_IDX] value. If the TED[RNG_IDX,AZ_IDX] value is less than the BEAM_BOT_EL[RNG_IDX} value, then skip step 4.8.

4.8

If the TED[RNG_IDX,AZ_DX] value is greater≧the value of MAX_EL, then set MAX_EL=TED[RNG_IDX, AZ_IDX] and set the CR[RNG_IDX,AZ_IDX] bin value to 2 to indicate the presence of radar-facing terrain within the path of the beam.

Else set the CR[RNG_IDX,AZ_IDX] bin value to 1 to indicate the presence of terrain which slopes away from the radar within the path of the beam.

4.9

A radar product clutter region map is then generated from the CR array data. The clutter region map has the same spatial resolution and dimensions as the corresponding radar product. The clutter region map bin indicates whether the corresponding radar product bin lies within an area that may be contaminated by clutter returns.

4.10

In general, there are many CR array bins that map to each clutter region map bin. The clutter region map bin value is the maximum value of all of the CR array bins that map to the clutter region map bin. The mapping of the radial formatted (polar coordinates) CR array data into the clutter region map depends on the format of the radar product data (radial or raster). The procedures for doing this are straightforward.

Algorithm 5. Generate Radar Coverage Maps for Radar Mosaic Products The radar product radar coverage and radar blockage maps generated by this invention have the same spatial structure as the radar products to which they are applied. Therefore, the mosaic generation techniques used to generate radar mosaic products from radar product data can be readily adapted to generate mosaic radar coverage products from radar product coverage maps. These mosaic radar coverage maps can then be applied to radar mosaic products data in the same manner that radar product coverage maps are applied to radar product data. FIG. 24 is a flow diagram of the algorithm which generates radar coverage and blockage maps for radar mosaic products in accordance with the preferred embodiment of the invention The procedure for generating radar product clutter region maps for a single tilt radar product is preferably executed stepwise as follows, but variations within the ambit of this invention will occur to those of ordinary skill in these and the programming arts:

5.1

A mosaic coverage map is defined with the same spatial structure as the corresponding mosaic product array to which the coverage map is to be applied.

5.2

Initialize all bins of the mosaic coverage map array to a 0% radar coverage value.

5.3

For each radar product that contributes to the mosaic product for which the coverage map is being generated, perform step 5.4:

5.4

For each bin of the radar product radar coverage map, perform steps 5.5–5.7:

5.5

Get the radar coverage value from the radar product radar coverage map bin.

5.6

Compute the mosaic coverage map array coordinates for the radar product coverage map bin using the same projection system used to map the corresponding radar product data into the radar mosaic product.

5.7

If the value of the radar product coverage map bin is greater than the current value of the mosaic radar coverage map array bin value, set the mosaic radar coverage map array bin equal to the radar product coverage map bin value.

Additional Concepts:

This invention may have additional applications for improving algorithms which operate on radar product and radar mosaic data sets. Specifically, it can be applied to improve the performance of radar mosaic generation algorithms which use consensus or support criteria in selecting mosaic bin data levels from a set of contributing radar bins. It may also have application for improving weather forecast algorithms which utilize radar product data for generating forecasts of future weather. The invention may also have application to improving the performance of storm growth and decay algorithms which use radar product data to predict how weather systems will develop and decay. Once the qualification maps are constructed, it is only a matter of determining what useful methods will be acceptable for applying the qualification maps to data so as to produce a more useful radar data product and/or display that incorporates the qualification mapping data.

Conclusion:

This invention illustrates a system having various methodologies for improving the data available for radar products and displays thereof, so that better qualified images may be made available to radar data product users.

What is claimed is:

1. A method for producing a qualification map product for a radar product comprising:

obtaining a dataset of terrain data for the radar product nominal coverage area;

parsing said dataset into bins for each radial of said radar product;

identifying the highest elevation terrain data point from each said bin;

calculating the coverage value for each said bin;

producing a data set of bin values for said coverage area.

2. The method of claim 1 further comprising;

producing a display data set of coverage values from said data set of bin values.

3. The method of claim 1 further comprising;

producing a display data set of blockage values from said data set of bin values.

4. The method of claim 1 further comprising;

producing a display data set of clutter values from said data set of bin values.

5. The method of claim 1 wherein said identifying step is accomplished substantially as follows:

generate a maximum terrain elevation data array from relevant terrain elevation databases by first initializing said maximum terrain elevation data array, for each terrain elevation database lat/long grid point that falls within the coverage range of the radar product, get the grid point elevation value from the terrain elevation database, compute the corresponding range and azimuth with respect to the radar lat/long position, convert the computed range and azimuth coordinates to the nearest terrain elevation array index values, compute the number of terrain elevation data array azimuth bins spanned by the data base grid point, update each of the terrain elevation data array bins as follows: If the elevation value for the grid point exceeds the current value of the terrain elevation data array bin, set the terrain elevation data array bin equal to the grid point elevation value, wherein when all the multiple terrain elevation database lat/long grid points map to each elevation array bin in the terrain elevation data array, the resulting value of a particular terrain elevation data array bin will be a maximum of all data base grid points that map to the terrain elevation data array bin.

6. A method of producing an elevation layer product employing the method of claim 1 composing:

producing a display data set from bin values in elevation range of interest intersecting all covering radar tilts of interest for a radar.

7. A method of producing a mosaic coverage map from each of the qualified radar maps produced with the method of claim 1, wherein said mosaic coverage map is defined with a same spatial structure as a corresponding mosaic radar product array to which the mosaic coverage map is to be applied, said method comprising:

for each one of said qualified maps, getting values for each bin;

for any bin from a qualified map having an overlap with a bin from another of said qualified maps, picking a most useful value for said bin;

using the most useful values of each of the bins within the corresponding product array to produce a completed mosaic coverage map of valued bins.

8. The method of claim 7 wherein said most useful value is a value indicating greatest coverage of all overlapping bin coverage values.

9. The method of claim 7 wherein said most useful value is a value indicating lowest blockage of all overlapping bin blockage values.

10. The method of claim 7 wherein said most useful value is a value indicating highest clutter of all overlapping bin clutter values.

11. The method of claim 7 wherein said most useful value is used to qualify radar product data related to said bin so as to produce a display of radar data accommodating said most useful value.

12. The method of claim 11 wherein said accommodation of said radar product data and said most useful value for a given bin is a consensus value.

13. An elevation tilt product qualification radar map produced by the method of claim 1.

14. An elevation layer product qualification radar map produced by the method of claim 6.

15. A radar mosaic product qualification radar map produced by the method of claim qualification map produced by the method of claim 7.

16. A data file in a data file containing medium, containing software code which when executing on a general purpose computer system can configure said general computer system to execute the steps of the method of claim 1.

17. A data file in a data file containing medium, containing software code which when executing on a general purpose computer system can configure said general computer system to execute the steps of the method of claim 6.

18. A data file in a data file containing medium, containing software code which when executing on a general purpose computer system can configure said general computer system to execute the steps of the method of claim 7.

19. A system comprising software code executing within at least one computer system memory, said software code configured for qualifying radar data product employing qualified coverage obtained in digital form from a coverage map produced with the method of claim 1, together with blockage, and/or clutter data maps, obtained in digital form from data sources and for modifying raw radar data product using said software code executing within said at least one said computer system memory so that a process modifies said raw radar data product in accord with information from said maps.

20. A method for producing a clutter region map for a radar product comprising:

obtaining a dataset of terrain data for the radar product nominal coverage area;

parsing said dataset into bins for each radial of said radar product;

identifying the highest elevation terrain data point from said bin;

calculating the clutter value for said bin;

delineating a data set of bin values for said coverage area.

21. The method of claim 20, further comprising; producing a map having clutter zones where said calculated clutter value is above a predetermined value.

* * * * *